United States Patent [19]
Kitai et al.

[11] Patent Number: 5,990,596
[45] Date of Patent: Nov. 23, 1999

[54] OPTICAL INFORMATION RECORDING AND/OR REPRODUCING APPARATUS AND METHOD WITH VIBRATION WAVE DRIVING DEVICE OR VIBRATION DRIVEN MOTOR DEVICE

[75] Inventors: Hiroto Kitai, Tokyo; Kazuaki Matsumoto, Kawasaki, both of Japan

[73] Assignee: Canon Kabushiki Kaisha, Tokyo, Japan

[21] Appl. No.: 09/105,999

[22] Filed: Jun. 29, 1998

Related U.S. Application Data

[62] Division of application No. 08/853,797, May 9, 1997, Pat. No. 5,805,540, which is a division of application No. 08/423,107, Apr. 18, 1995, abandoned.

[30] Foreign Application Priority Data

Apr. 20, 1994 [JP] Japan .................................. 6-81659
Apr. 20, 1994 [JP] Japan .................................. 6-81660

[51] Int. Cl.$^6$ ............................. H01L 41/04; H02N 7/06
[52] U.S. Cl. ............................................ 310/316; 318/116
[58] Field of Search ............................. 310/316; 318/116

[56] References Cited

U.S. PATENT DOCUMENTS

| | | | |
|---|---|---|---|
| 5,270,988 | 12/1993 | Kobayashi | 369/32 |
| 5,272,688 | 12/1993 | Horiguchi | 369/99 |
| 5,384,507 | 1/1995 | Takada et al. | 310/317 |
| 5,461,273 | 10/1995 | Kawasaki et al. | 310/316 |
| 5,557,156 | 9/1996 | Elings | 310/316 |
| 5,568,003 | 10/1996 | Deck | 310/316 |
| 5,714,831 | 2/1998 | Walker et al. | 310/316 |
| 5,805,540 | 9/1998 | Kitai et al. | 369/44.28 |

FOREIGN PATENT DOCUMENTS

| | | |
|---|---|---|
| 0292008 | 11/1988 | European Pat. Off. . |
| 0403298 | 12/1990 | European Pat. Off. . |
| 0617415 | 9/1994 | European Pat. Off. . |
| 3406408 | 8/1984 | Germany . |
| 63-83942 | 4/1988 | Japan . |
| 63-193359 | 8/1988 | Japan . |
| 1021688 | 1/1989 | Japan . |
| 1264665 | 10/1989 | Japan . |
| 3256579 | 11/1991 | Japan . |
| 5095685 | 4/1993 | Japan . |

OTHER PUBLICATIONS

European Search Report dated Mar. 14, 1996.

*Primary Examiner*—Nestor Ramirez
*Assistant Examiner*—Peter Medley
*Attorney, Agent, or Firm*—Fitzpatrick, Cella, Harper & Scinto

[57] ABSTRACT

An information recording and/or reproducing apparatus, for performing recording and/or reproduction of information on a recording medium with a light beam emitted from an optical head, includes a vibration wave driving device for relatively moving the optical head to the medium, and a device for detecting information corresponding to a relation between a control signal for driving the vibration wave driving device and a relative movement velocity in the relative movement. The vibration wave driving device is controlled based on the information detected.

5 Claims, 19 Drawing Sheets

FIG. 3A
PRIOR ART
CARRIAGE POSITION
(POSITION OF OBJECTIVE
LENS TO OPTICAL HEAD)
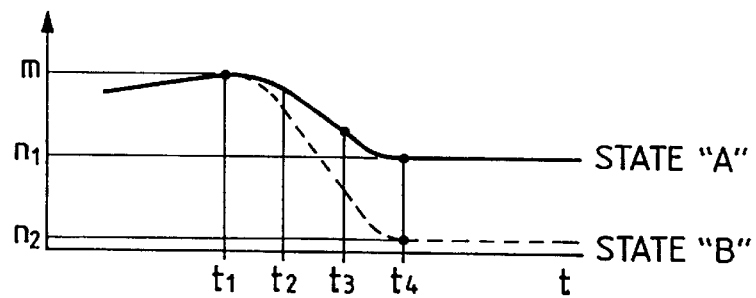
FIG. 3B
PRIOR ART
ON/OFF SIGNAL OF
ULTRASONIC MOTOR
FIG. 3C
PRIOR ART
DRIVE VOLTAGE OF
ULTRASONIC MOTOR
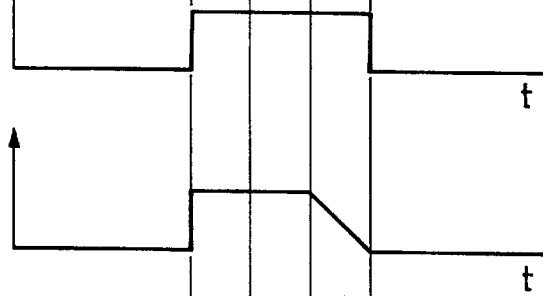
FIG. 3D
PRIOR ART
POSITION OF LIGHT BEAM
TO TRACK (AT ERROR)
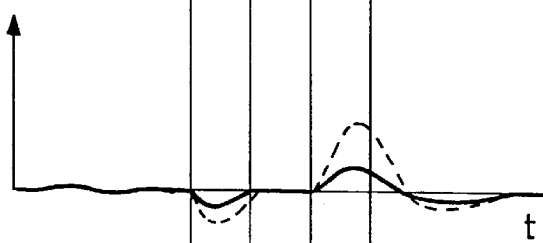
FIG. 3E
PRIOR ART
CARRIAGE VELOCITY
(MOVING VELOCITY OF
OBJECTIVE LENS)
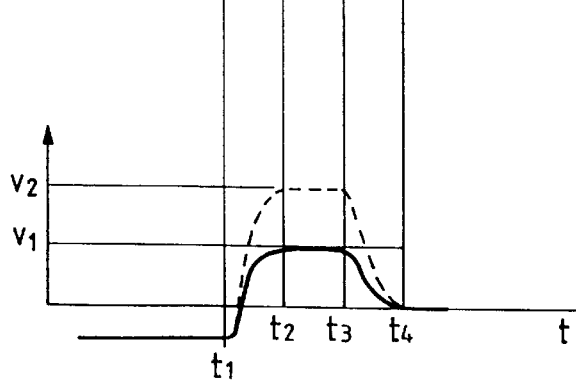

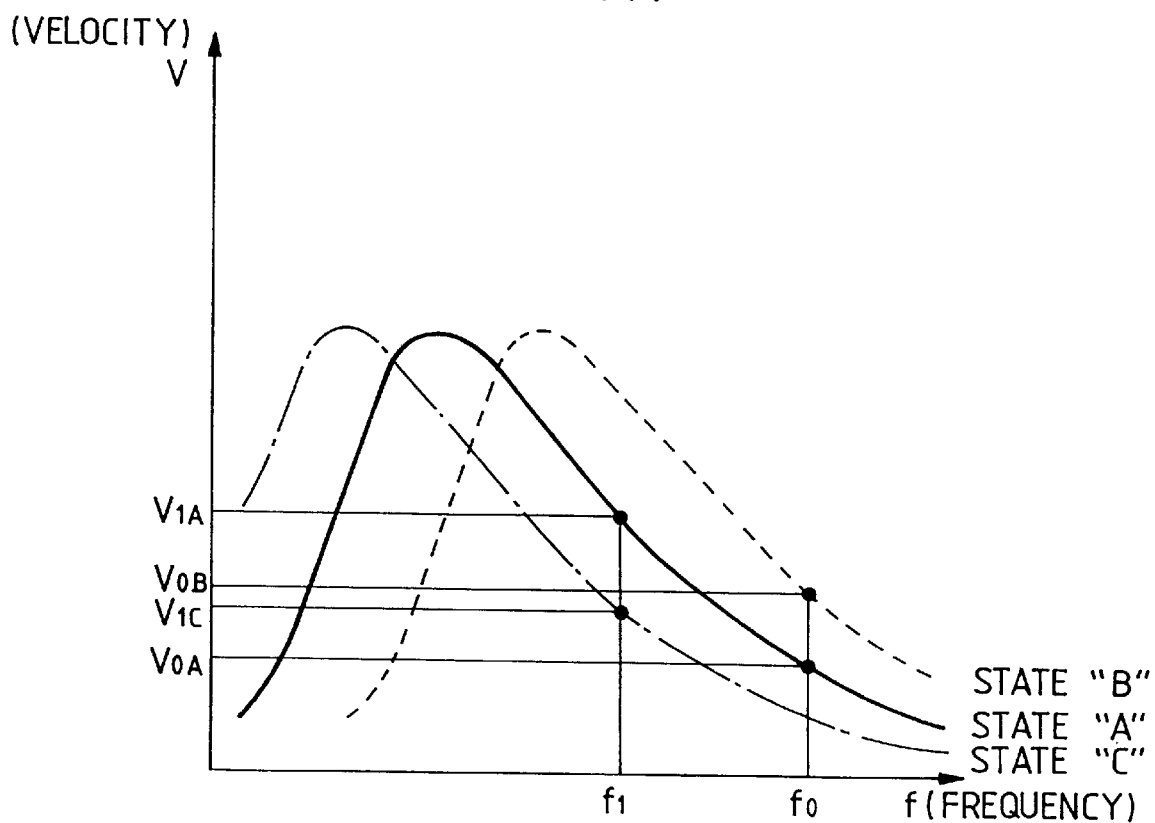

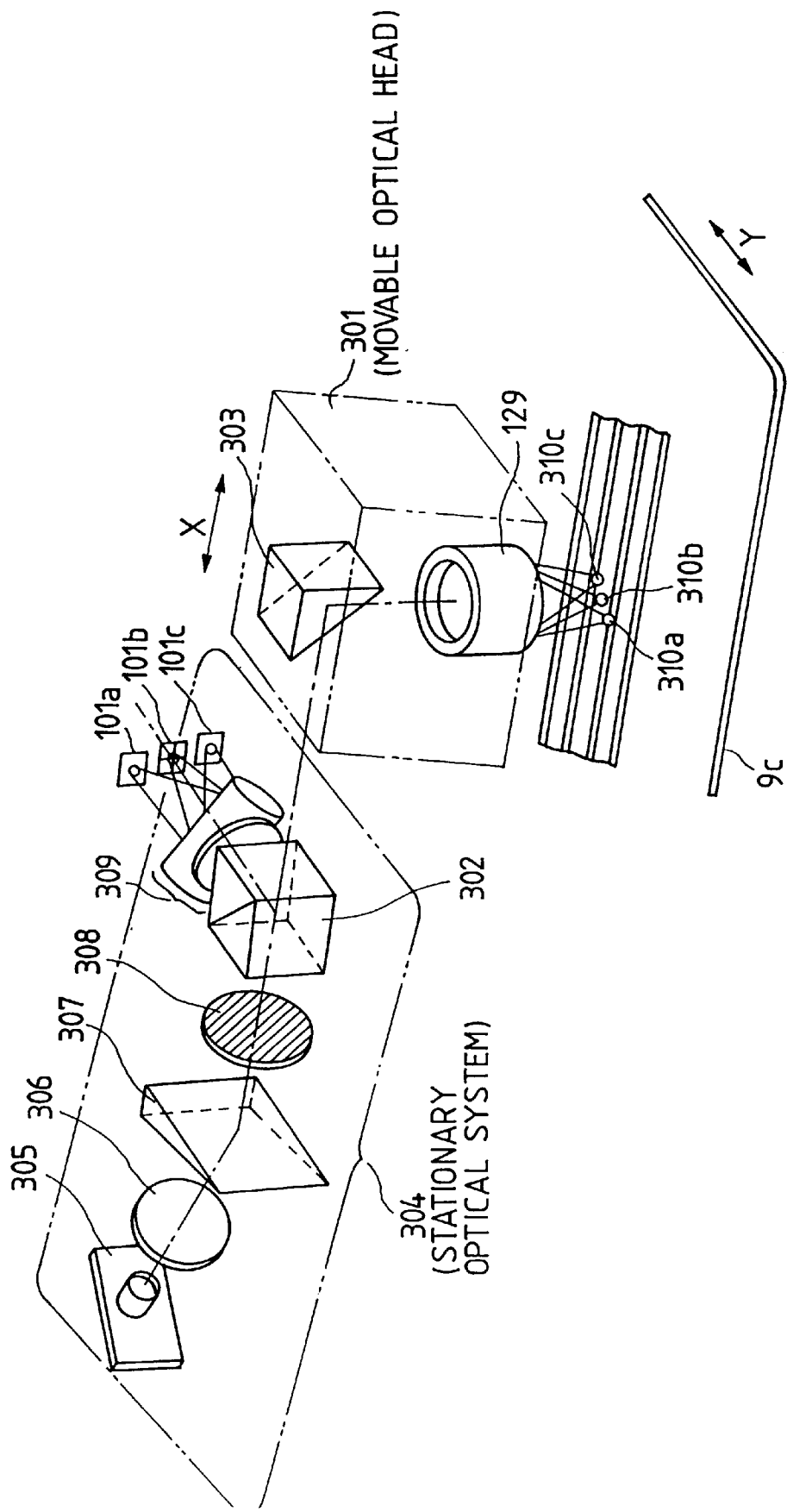

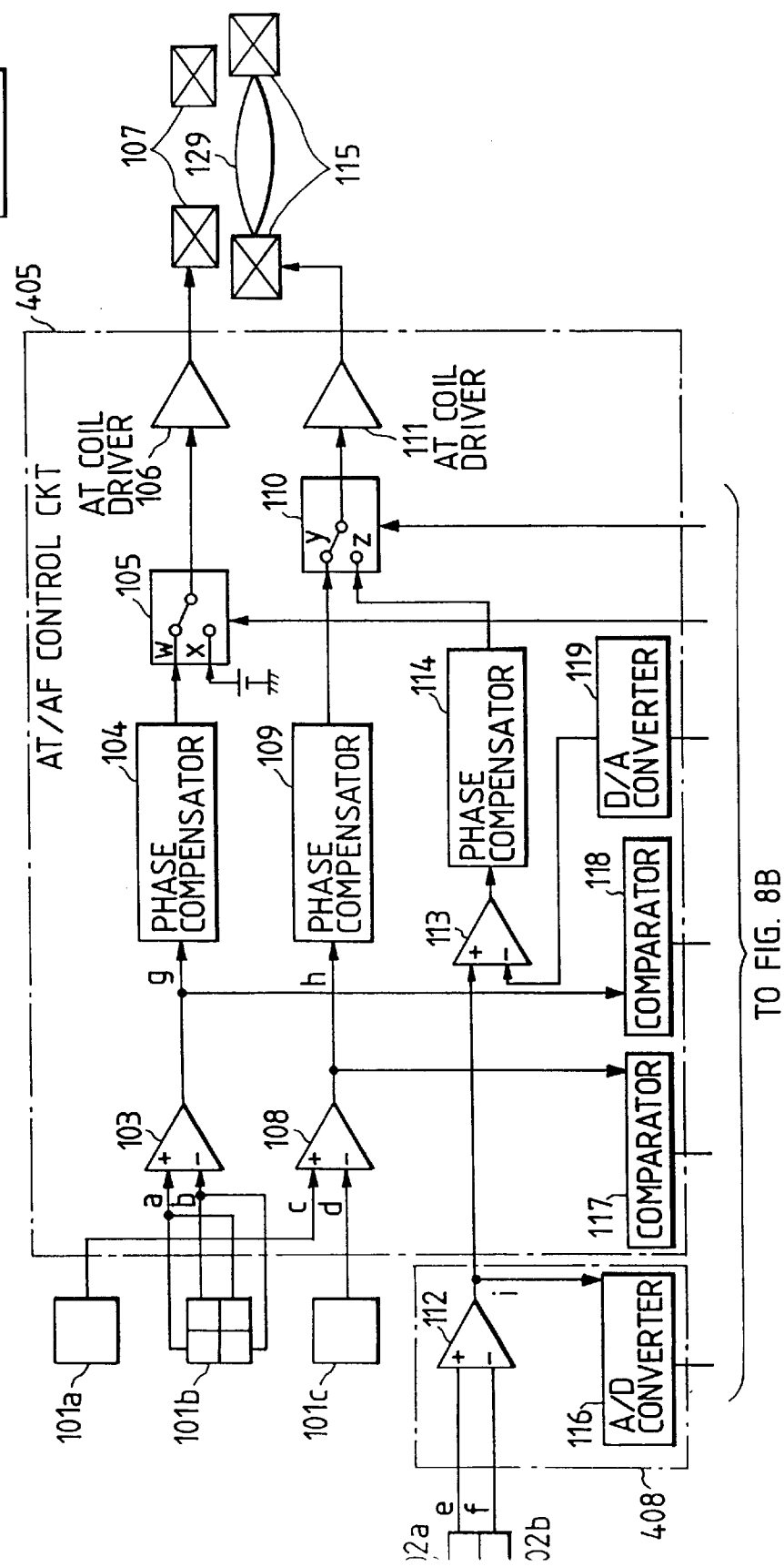

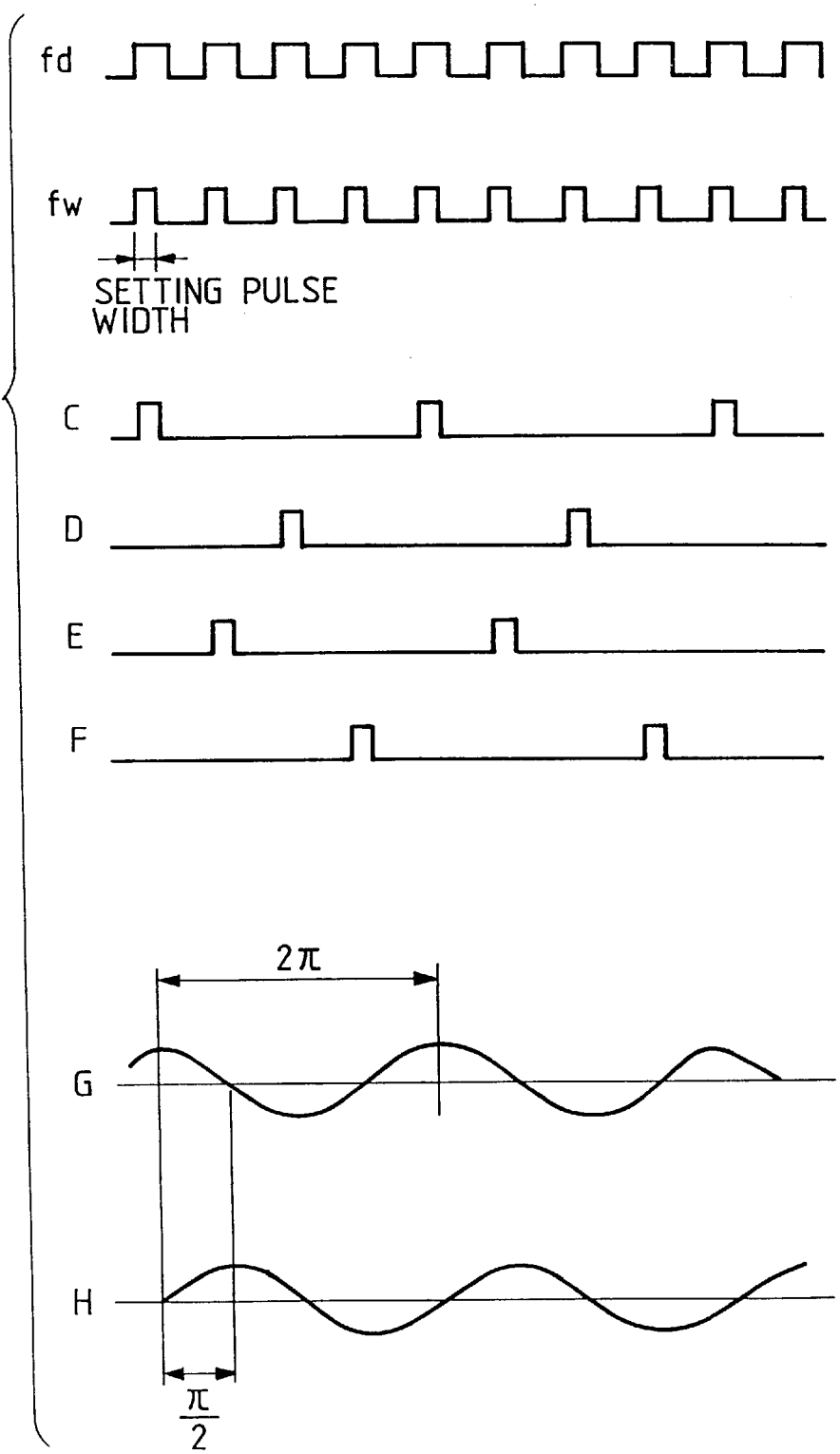

(DIRECTION-1)

(DIRECTION-2)

OPTICAL INFORMATION RECORDING AND/OR REPRODUCING APPARATUS AND METHOD WITH VIBRATION WAVE DRIVING DEVICE OR VIBRATION DRIVEN MOTOR DEVICE

This present invention is a divisional application of Application No. 08/853,797 filed May 9, 1997, now U.S. Pat. No. 5,805,540 which is a divisional of Application No. 08/423,107 filed Apr. 18, 1995, now abandoned.

BACKGROUND OF THE INVENTION

1. Field of the Invention

The present invention relates to an optical information recording and/or reproducing apparatus for optically recording or reproducing information by relatively translating an optical head to an optical information recording medium so as to scan information tracks in the recording medium with a light beam from the optical head. More particularly, the invention relates to an optical information recording and/or reproducing apparatus using a vibration wave driving device as means for moving the optical information recording medium and a vibration wave motor device capable of providing an output characteristic precisely irrespective of environmental changes.

2. Related Background Art

Recently, optical information recording and/or reproducing apparatus for optically recording or reproducing information with a light beam are drawing attention among information recording and/or reproducing apparatuses for recording or reproducing information on a recording medium. As the recording medium for optically recording or reproducing information there are those of a disk type, a card type, etc., among which card type recording media (hereinafter referred to as optical cards) are excellent in productivity, portability and accessibility and have a wide range of applications.

Information is recorded in the recording medium by scanning information tracks with a light beam of a fine spot modulated according to recording information, and is recorded in the form of information bit strings optically detectable.

On the other hand, information is reproduced from the recording medium by scanning the information bit strings on the information tracks with a light beam spot of constant power not enough to result in recording in the medium and then detecting reflected light or transmitted light from the recording medium.

The optical head used in recording or reproducing the information in or from the above recording medium is relatively movable with respect to the recording medium in directions along the information tracks and in directions traversing the information track directions, and movement of the optical head causes the light beam spot to scan the information tracks.

The optical head is provided with a converging lens for converging the light beam spot, an example of which is an objective lens. The objective lens is held so that it can move independently with respect to the optical head body in directions along the optical axis thereof (or in focusing directions) and in directions perpendicular to both the directions along the optical axis and the directions of the information tracks on the recording medium (or in tracking directions). Such holding of the objective lens is generally effected through an elastic member, and the movement of the objective lens in the two ways described above is generally driven by an actuator utilizing magnetic interaction.

FIG. 1 is a diagrammatic, plan view of a write-once optical card. There are a lot of information tracks 1001 arranged on an information recording surface of optical card 1000 in parallel in L-F directions. Also, a home position 1002 is provided as a reference position of access to the information tracks 1001 in the information recording surface of optical card 1000. The information tracks 1001 are arranged in the order of 1001-1, 1001-2, 1001-3, . . . from the side of home position 1002. Further, as shown in FIG. 2, there are tracking tracks 1003-1, 1003-2, 1003-3, . . . provided adjacent to the corresponding information tracks. These tracking tracks are used as a guide for autotracking (hereinafter referred to as AT) for controlling the beam spot so as not to depart from a selected information track during the scanning with the light beam spot in recording or reproducing information.

This AT control is performed using a servo system in the optical head, which is arranged so that deviation (AT error) of the above light beam spot from an information track is detected and this detected information is negatively fed back to a tracking actuator for driving the objective lens described above in the tracking directions, whereby the light beam spot is let to follow the desired information track while moving the objective lens relative to the optical head body in the tracking directions (along the D direction).

The AT control uses light spots of $S_1$ and $S_3$ and utilizes reflected light from tracking tracks on which the light spots $S_1$, $S_3$ impinge. Recording and/or reproduction of information is carried out using a light spot $S_2$ located between the two light spots $S_1$ and $S_3$ The light spots $S_1$, $S_2$, $S_3$ are obtained from a same light source so that they are formed at equal intervals with the light spot $S_2$ between the light spots $S_1$ and $S_3$ by interference effect of a diffraction grating located between the light source and the objective lens.

While the information tracks are scanned with the light beam spot upon recording or reproducing information, autofocusing (hereinafter referred to as AF) control for the objective lens is carried out in order to shape (or focus) the light beam in a spot of an appropriate size on a recording surface of the optical card.

This AF control is carried out in such a manner that deviation (AF error) of the above light beam spot from an in-focus state is detected in the optical head, the thus detected signal is negatively fed back to a focusing actuator for moving the objective lens along the optical axis thereof, and the objective lens is moved relative to the optical head body in the focusing direction to focus the light beam spot on a recording surface of the optical card.

Meanwhile, as a method for relative scan between the light beam emitted from a semiconductor laser and the optical card, the optical card is mounted on a base (hereinafter referred to as a carriage), which is not movable in the directions along the tracks in the optical card but movable in the directions traversing the track directions, and the optical head body is moved using a voice coil motor in the directions parallel to the tracks on the optical card.

A vibration wave driving device (for example, an ultrasonic motor) is used for moving the carriage.

A first reason why the carriage is arranged to move in the directions perpendicular to (or traversing) the information tracks in the optical information recording and/or reproducing apparatus in the above structure is to enable access to another information track, and in this case, high-speed scanning is conducted in conventional apparatus while keeping the AT control in an off state.

A second reason is as follows. If there is deviation (hereinafter referred to as skew) as to parallelism between the tracks on the optical card and the scanning system in the track directions, for example in the case where the optical card is not regularly mounted on the carriage, and when the scanning in the track directions is performed while keeping the AT control in an on state, the objective lens is drive-controlled so as to be biased relative to the optical head body. There is, however, a limit in a biasing amount of the objective lens relative to the optical head body. Thus, the biasing amount could reach the limit during scanning in the length direction of the track. Therefore, the second reason is to keep the bias of the objective lens relative to the optical head body within a permissible range by moving (or relatively and finely moving) the carriage in the directions perpendicular to the tracks during scanning of light beam.

Here is briefly described the structure and the principle of driving of the vibration wave driving device.

A vibrator is formed by bonding a piezoelectric device which is an electricity-mechanical energy conversion element with an adhesive or the like to an elastic body made of a low-vibration-damping metal, for example an elastic body formed in an elongate oval shape, the vibrator is fixed to the back face or side surface of the carriage as described previously on the piezoelectric device side, and a straight portion on one side of a free end face of the elastic body is brought into press contact through a pressing means with a rail stator extending along the moving direction of the carriage.

The piezoelectric device includes piezoelectric device groups of two phases A and B separated at an odd multiple of a quarter wave from each other, and in each group there are formed piezoelectric devices different in polarizing-treatment direction in the thickness direction at intervals of $\lambda/2$. Then cyclic voltages such as alternating voltages with a phase difference of 90° therebetween are applied to the piezoelectric device groups of the two phases A, B, whereby standing waves are oscillated by the respective piezoelectric device groups of the two phases A, B. The standing waves are synthesized to form traveling waves, which cause surface particles in the free end face of the elastic body to make an elliptical motion in a plane along the thickness direction, thereby moving the carriage by frictional drive against the stator.

FIGS. 3A to 3E are signal diagrams to show the operation of the above conventional example. FIG. 3A shows output signals from a lens position detecting circuit for detecting the position of the objective lens where the carriage with the optical card mounted thereon is moved by a short distance in the direction perpendicular to the tracks in an on state of tracking when the lens is located at distance m to the center position of lens. In this case, because the AT control is on, a motion of the objective lens relative to the optical head body becomes nearly equal to a motion of the carriage relative to the optical head body.

The vibration wave driving device starts moving the carriage at time $t_1$ in the direction perpendicular to the tracks.

FIG. 3B shows an on-off signal of the vibration wave driving device, which is on in a time period between time $t_1$ and time $t_4$.

FIG. 3C is a drive voltage of the vibration wave driving device. The voltage is constant between time $t_1$ and time $t_3$ and the drive voltage is gradually decreased between time $t_3$ and time $t_4$ so as to decelerate to stop the carriage.

When the drive voltage of the vibration wave driving device is constant, the drive frequency determines a drive speed of the vibration wave driving device, that is, a velocity of the carriage (hereafter referred to as a carriage velocity) in the direction perpendicular to the tracks with respect to the optical head body. Here, FIG. 4 shows a relation of the carriage velocity v against the drive frequency f of the vibration wave driving device.

Let a state A (a curved solid line) represent a state in which the carriage velocity is $V_{OA}$ when the drive frequency of the vibration wave driving device is $f_0$, as shown in FIG. 4. In FIG. 3A, the carriage starts moving at time $t_1$, then the carriage velocity becomes approximately constant after the delay time $t_2$, the carriage starts decelerating at time $t_3$, and it stops at time $t_4$. In this case, a moving distance of the objective lens relative to the optical head is $m-n_1$.

Further, FIG. 3E shows the moving velocity of the objective lens and at the same time, indicates that the carriage velocity is approximately constant between time $t_2$ and time $t_3$.

FIG. 3D indicates the position of the light beam relative to the track (AT error) when the above carriage movement was performed. In FIG. 3D the solid line shows a change of AT error corresponding to the changes of the solid lines shown in FIG. 3A and FIG. 3E. As seen from FIG. 3D, the AT error becomes temporarily large upon the movement start of the carriage and again becomes large upon deceleration.

FIG. 5 is a structural drawing to show an example of the optical card recording and/or reproducing apparatus for recording or reproducing information in or from the optical card. In FIG. 5, reference numeral 200 designates the optical card being an information recording medium, and 201 the carriage on which the optical card 200 is mounted. The carriage 201 is arranged to be movable in the directions traversing the information tracks by drive of the vibration wave driving device (composed of a vibrator 202 and a carriage drive circuit). Numeral 202 denotes the vibrator. Numeral 203 represents the optical head in which a semiconductor laser as a light source and a photoelectric transducer are incorporated, 204 the objective lens provided on the optical head 203 to converge a light beam and to irradiate the optical card 200 therewith, 205 a comparator for comparing an information track intersecting signal output from the optical head 203 and inputting a result to MPU 206, 206 MPU for controlling the elements in the apparatus, 207 a carriage drive circuit for controlling the drive of vibrator 202 under a command from MPU 206, and 208 a lens position detecting circuit for outputting a deviation amount of objective lens 204 from the center position of optical head 203, output from the optical head 203, to MPU 206. Numeral 209 denotes a memory device for storing the voltage output to the carriage driving circuit 207 and the moving velocity of the carriage 201.

Here, suppose the light beam output from the optical head 203 is located on a certain information track on the optical card 200. A so-called seek control is performed in this case to move the light beam to another information track. If a target information track is outside a movable range of the objective lens 204 in the optical head 203, MPU 206 outputs a command to drive the vibrator 202 to the carriage driving circuit 207. The carriage driving circuit 207 outputs a drive voltage with a drive frequency and an amplitude preliminarily set in MPU 206 to the vibrator 202, thereby driving the carriage 201 with the optical card 200 mounted thereon. This relatively moves the information tracks on the optical card 200 in the information-track-traversing direction with respect to the light beam output through the objective lens 204, so that the optical head 203 outputs an information track intersecting signal through the comparator 205 to MPU 206 every time the light beam traverses an information track. When a number of input pulses from the comparator 205 reaches a target value, MPU 206 then outputs a command to stop the drive of vibrator 202 to the carriage driving circuit 207. Then the carriage driving circuit 207 stops the output of drive voltage so as to stop the carriage, thus completing movement of the light beam to the target information track.

Relative fine movement is next described. Suppose the optical card 200 has a skew angle θ as shown in FIG. 6. Let us consider a case that the objective lens 204 was moved relative to the optical head 203 to a left or right limit in the movable range from the center while the optical head 203 was kept in a scanning operation on an information track in an autotracking state. Since a current position of the objective lens 204 is input from the optical head 203 through the lens position detecting circuit 208 to MPU 206, MPU 206 judges from this signal that the objective lens is at the movable limit and gives the carriage drive circuit 207 such a command that the carriage drive circuit 207 should output to the vibrator 202 a drive voltage with such a drive frequency and an amplitude as to keep the moving velocity of carriage 201 slower than that in the seek control preliminarily set, thereby moving the carriage 201 so that the objective lens 204 is brought to the center of optical head 203. As soon as the information tracks on the optical card 200 start moving, the objective lens 204 also starts moving in the same direction because it is in the autotracking state. Since the position of objective lens 204 is input through the lens position detecting circuit 208 to MPU 206, a command to stop the output of drive voltage to the vibrator 202 is sent to the carriage drive circuit 207 when the objective lens 204 reaches the center position of optical head 203.

In this manner, correction is made in movement of the light beam to the information track and in positional relation between the light beam and the information track.

The relation between the drive frequency of the vibration wave driving device and the carriage velocity, however, is not constant because of machine differences, changes in environmental conditions such as the temperature or the humidity, changes with time, etc. Therefore, a same velocity would not be achieved even if drive is made at a constant drive frequency and a constant drive voltage.

The optical information recording and/or reproducing apparatus had such a problem that in the case of fine feed to move the carriage with the optical card mounted thereon in the direction perpendicular to the tracks in the tracking state with the AT control being on, for example if the moving speed of the carriage increases so as to make an AT error exceed a permissible value upon movement of carriage, the light beam deviates from a track to become incapable of recording or reproducing information, in turn causing track off.

Conversely, if the moving velocity of the carriage is too low, a moving amount per unit time becomes small, thereby failing to achieve a necessary moving amount.

Here, the state B shown by the dashed lines in FIGS. 3A–3E represents a case that the moving velocity of the carriage became higher in spite of the same drive frequency. FIG. 4 shows a case that the relation between the drive frequency (f) of the vibration wave driving device versus the velocity (v) changed from the state A to the state B because of machine differences, environmental conditions, changes with time, etc. Suppose the change is from the state A represented by the solid line on which the velocity $v_{OA}$ was attained by drive frequency $f_0$ to the state B represented by the dashed line B on which the velocity $v_{OB}$ is obtained by drive frequency $f_0$. When the vibration wave driving device is driven at the same drive frequency $f_0$, the carriage starts moving at time $t_1$ as in the state B shown by the dashed lines in FIGS. 3A–3E, the velocity becomes greater than that in the state A shown by the solid line, and the carriage starts decelerating at time $t_3$ then to stop at a position of $n_2$ at time $t_4$. In this case, because the device is decelerated and stopped from the large velocity, the AT error becomes greater as shown in the state B represented by the dashed line in FIG. 3D as against that in the state A shown by the solid line. Therefore, there was a drawback that the deviation of the light beam relative to the track became greater, thereby making normal recording or reproduction impossible.

Since the seek operation requires a higher speed than in the fine feed operation of carriage, the carriage is driven at drive frequency $f_1$ in the state A shown by the solid line in FIG. 4, thereby achieving a desired carriage velocity $v_{1A}$. However, if the relation of drive frequency versus carriage velocity changes as shown in the state C shown by the chain line, the carriage velocity at drive frequency $f_1$ is just $v_{1C}$, thus failing to obtain a desired velocity. Therefore, there was a drawback that the necessary time for seek operation became longer.

SUMMARY OF THE INVENTION

The present invention has been accomplished in view of the above problems, and an object of the invention is to provide an optical information recording and/or reproducing apparatus which can always perform normal recording and/or reproduction without causing AT off and without an increase of necessary time for seek operation even if there are device differences, environmental changes, or changes with time.

The above object can be achieved by an information recording and/or reproducing apparatus for performing recording and/or reproduction of information on a recording medium with a light beam emitted from an optical head, which comprises:

vibration wave driving means for conducting relative movement between the optical head and the medium; and means for detecting information corresponding to a relation between a control signal for driving the vibration wave driving means and a relative movement velocity in the relative movement;

wherein the vibration wave driving means is controlled based on the information detected.

Further, the object can be achieved by an information recording and/or reproducing method, in which while relative movement is made between an optical head and a recording medium by vibration wave driving means, recording and/or reproduction of information on the medium is performed with a light beam emitted from the optical head, comprising:

a step of detecting information corresponding to a relation between a control signal for driving the vibration wave driving means and a relative movement speed in the relative movement; and a step of controlling said vibration wave driving means, based on said information detected.

Further, the object of the invention is to provide a vibration driven motor device in which a desired output characteristic can be obtained irrespective of environmental changes.

The object of the invention can be achieved by a vibration driven motor device in which frequency signals differing in phases are applied to an electricity-mechanical energy conversion element provided on a vibration member to excite the vibration member to thereby obtain a driving force, which includes memory means for storing information indicating a reference driving characteristic of the motor, measuring means for measuring a driving output when a frequency signal with a predetermined value is applied to the electricity-mechanical energy conversion element, and calculation means for obtaining a frequency signal value for obtaining a predetermined output characteristic on the basis of the reference driving characteristic stored in the memory device and the output measured by the measuring means, wherein driving of the motor is performed using the frequency signal value calculated by the calculation means.

BRIEF DESCRIPTION OF THE DRAWINGS

FIGS. 3A to 3E are drawings to show the operation of the vibration wave driving device in a conventional optical information recording and/or reproducing apparatus;

FIG. 4 is a drawing to show a relation between the frequency of the vibration wave driving device and the velocity;

FIG. 7 is a perspective view of an optical system in the optical information recording and/or reproducing apparatus of the present invention;

FIG. 9 is a timing chart to show signal waveforms in respective portions in the carriage driving circuit shown in FIGS. 8A and 8B;

Figure 1:
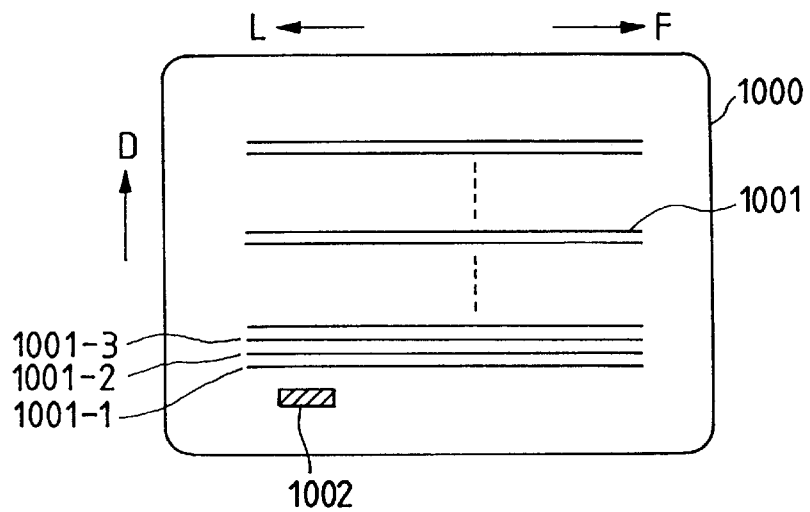
FIG. 1 is a diagrammatic, plan view of a write-once optical card.
Figure 2:
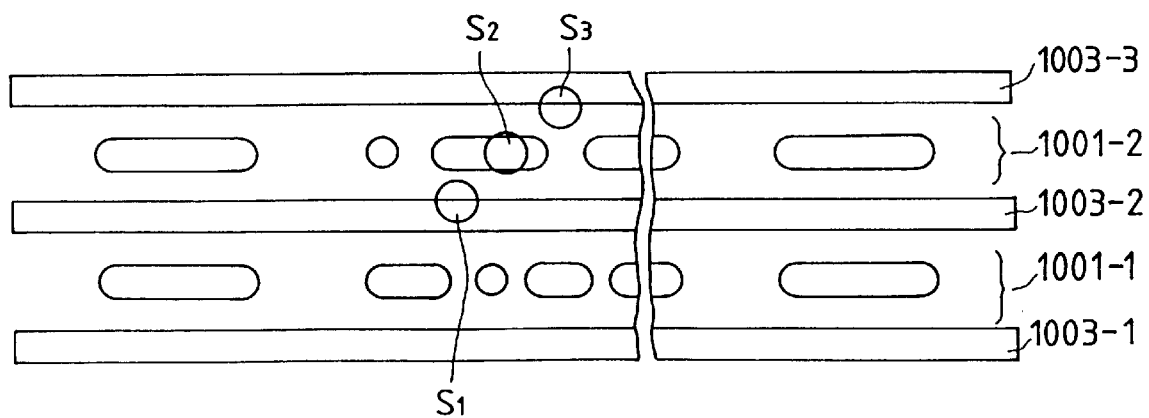
FIG. 2 is an enlarged, plan view of tracks in the optical card.
Figure 5:
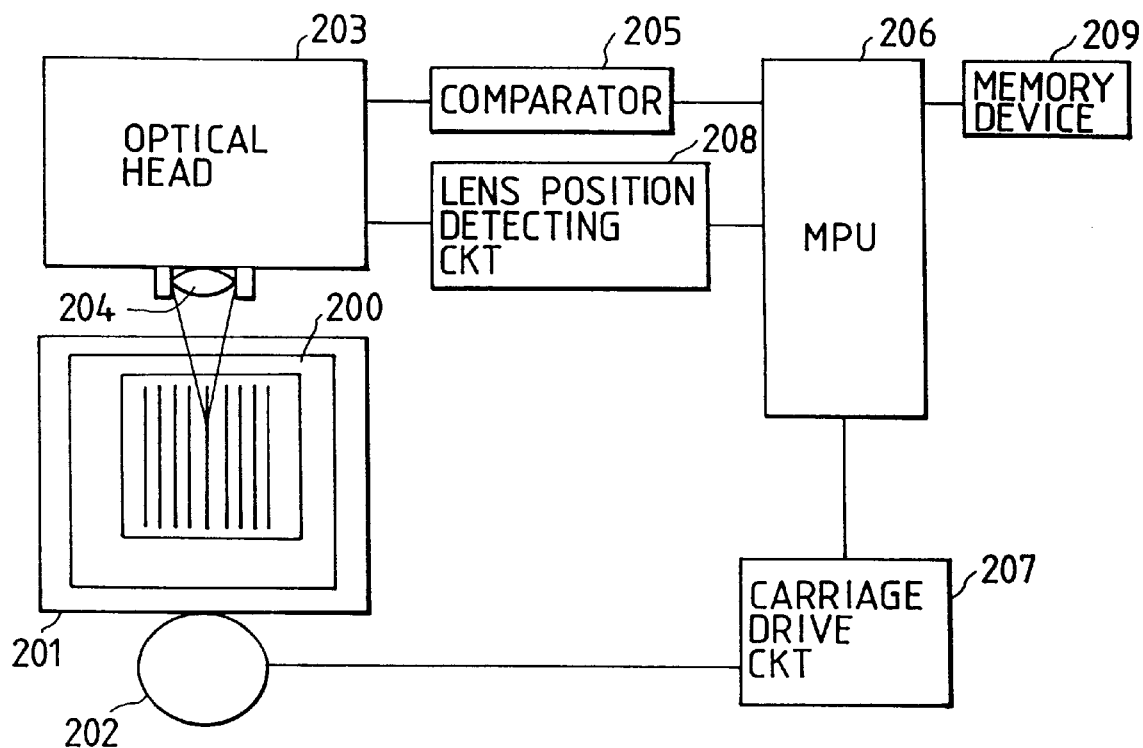
FIG. 5 is a block diagram to show a conventional optical information recording and/or reproducing apparatus.
Figure 6:
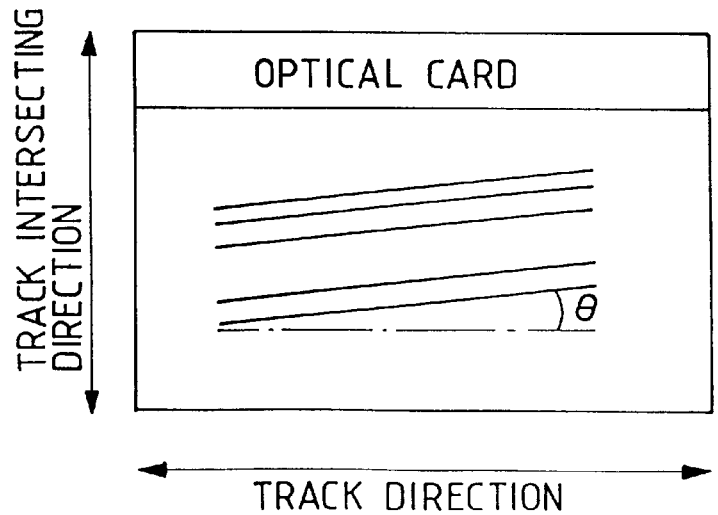
FIG. 6 is a drawing to show a skew angle.

DETAILED DESCRIPTION OF THE PREFERRED EMBODIMENTS (First Embodiment)

FIG. 7 is a schematic drawing of an optical system in the optical information recording and/or reproducing apparatus of the present invention.

Reference numeral 301 designates a movable optical head, which translationally moves in the X directions in the drawing along the tracks formed in the longitudinal direction of the optical card 9c, so that light beams from a stationary optical system 304 are guided onto the optical card 9c. The movable optical head 301 has an objective lens 129 for converging the light beams and a reflective mirror 303 for reflecting the light beams from the stationary optical system 304 toward the objective lens 129. The objective lens 129 is mounted to the main body of the movable optical head 301 through a moving coil for AF not shown and a moving coil for AT not shown. The objective lens 129 is moved along the optical axis by driving the AF moving coil, so that the light beams converged form AT spots 310a, 310c and an AF spot 310b on the optical card 9c. By driving the AT moving coil, the objective lens 129 is moved relative to the main body of the movable optical head 301 in a direction traversing the tracks on the optical card 9c.

The stationary optical system 304 is an optical system for emitting beams for recording or reproduction of information and detecting reflected light thereof, which is set separately from the movable optical head 301. The stationary optical system 304 is provided with an optical system consisting of a semiconductor laser 305 of an emission source, a collimator lens 306, a light beam shaping prism 307, a diffraction grating 308, a beam splitter 302, and an astigmatic condenser lens 309, and AT photodetectors 101a, 101c and an AF photodetector 101b, on which the spots 310a, 310b, 310c reflected by the optical card 9c and then traveling via the beam splitter 302 and through the astigmatic condenser lens 309 are focused.

Figure 8B:
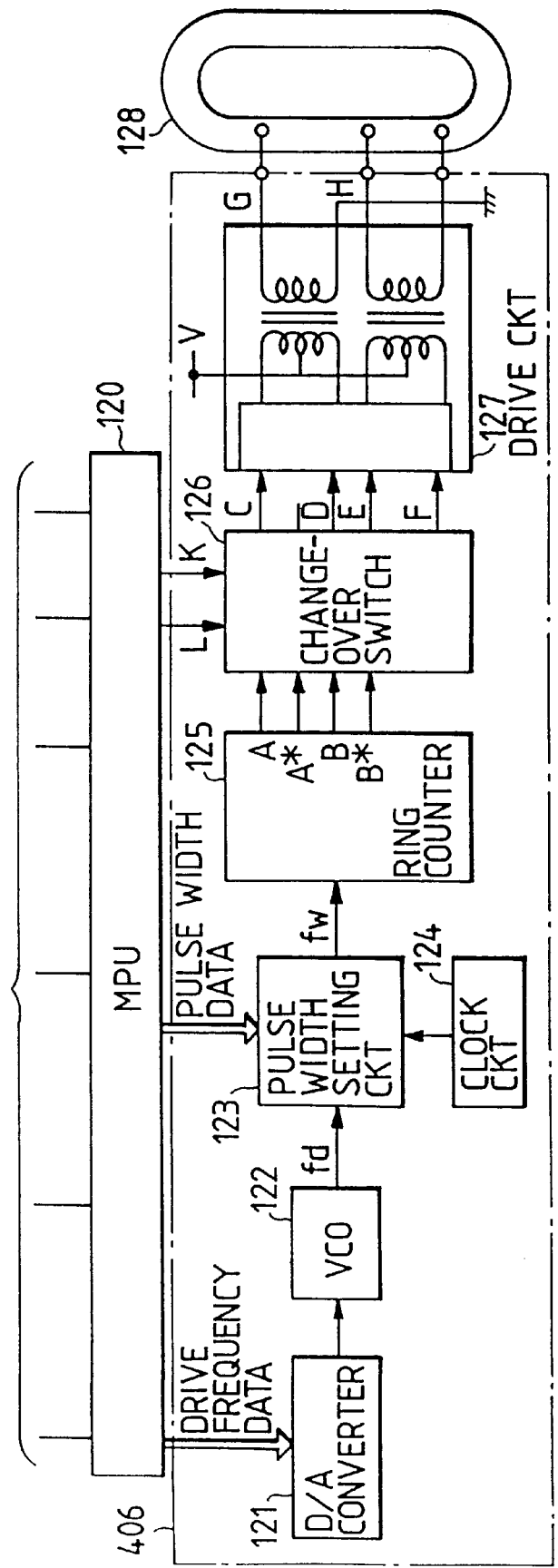
FIG. 8 is comprised of FIGS. 8A and 8B showing block diagrams of a control system in the optical information recording and/or reproducing apparatus of the present invention.

FIGS. 8A and 8B are block diagrams of control system to show an AF control system, an AT control system, a lens position detecting circuit, and a carriage drive circuit in the optical information recording and/or reproducing apparatus of the present invention. The AF photodetector 101b provided in the stationary optical system 304 is a quarterly divided detector for detecting the AF spot of the center light out of the light beams reflected by the optical card 9c, which are originally from the light beam emitted from the semiconductor laser 305, and supplies outputs therefrom a, b, each obtained by adding outputs from two sensors on a diagonal line, to a differential amplifier 103. An AF error signal g, which is an output from the differential amplifier 103, is input into a phase compensator 104 and also into a comparator 118. The comparator 118 compares the AF error signal g and inputs a result to MPU 120. An output from the phase compensator 104 is input into a W terminal of a changeover switch 105. The changeover switch 105 selects the W or X terminal in accordance with a changeover signal from MPU 120. A constant voltage is input to the X terminal. A signal selected by the changeover switch 105 is put into an AF coil driver 106 then to drive an AF coil 107 in an AF actuator.

The AT detectors 101a, 101c are detectors for detecting the AT spots of the side light out of the light beams reflected by the optical card 9c, which are originally from the light beam emitted from the semiconductor laser, and supply outputs therefrom c, d to a differential amplifier 108. An AT error signal h, which is an output from the differential amplifier 108, is input into a phase compensator 109 and also into a comparator 117, a signal after comparison from which is input into MPU 120. An output from the phase compensator 109 is input into a Y terminal of a changeover switch 110.

On the other hand, a light beam from an unrepresented LED provided in the movable optical head 301 is reflected by a reflecting plate placed on a side surface of a lens barrel of the objective lens 129 and a reflected light beam is guided to impinge on a pair of position sensors 102a, 102b.

Output signals e, f from the position sensors 102a, 102b are input into a differential amplifier 112 in the lens position detecting circuit 408. A lens position signal i as being an output from the differential amplifier 112 is supplied to one input terminal of a differential amplifier 113 and also to an A/D converter 116, and an output from the A/D converter 116 is supplied to MPU 120. Here, the lens position detecting circuit 408 composed of the differential amplifier 112 and the A/D converter 116, and MPU 120 connected thereto constitute an objective moving velocity detecting means for detecting the moving velocity of the objective lens.

Also, the other input terminal of the differential amplifier 113 is connected through a D/A converter 119 to MPU 120. An output from the differential amplifier 113 is input into a phase compensator 114, and an output from the phase compensator 114 is input into a Z terminal of the changeover switch 110. The changeover switch 110 can select either one of a tracking servo state (Y terminal side) and a lens position servo state (Z terminal side) by a changeover signal from MPU 120. An output from the changeover switch 110 is input into an AT coil driver 111 to perform power amplification, whereby an AT coil 115 in an AT actuator, which is a first driving means, can be driven so as to move the objective lens 129 in the direction perpendicular to the tracks.

Numeral 406 designates the carriage drive circuit, which is a drive circuit of the vibration wave driving device (for example, an ultrasonic motor), and 128 a vibrator constructed in the same structure as the aforementioned vibrator in which a piezoelectric device is bonded to one surface of an elastic body formed in an elongate elliptical shape in the vibration wave driving device. The piezoelectric device is connected with the carriage driving circuit 406 through a flexible printed board. Signals in the drive circuit 406 are shown in FIG. 9.

An input of D/A converter 121 is connected to MPU 120, and the converter outputs an analog voltage when receiving a digital value from MPU 120. An output from the D/A converter 121 is input into a voltage controlled oscillator (VCO) 122, where voltage-frequency conversion is performed, and thereafter it outputs a drive frequency signal fd to a pulse width setting circuit 123. The pulse width setting circuit 123 generates a signal fw adjusted in an arbitrary pulse width from pulse width data received from MPU 120 and a clock signal received from a clock circuit 124 and outputs the signal fw to an input of a ring counter 125.

The ring counter 125 divides the signal fw into four phases and outputs them as respective phase outputs A, A*, B, B* to a changeover switch 126. The changeover switch 126 receives an on-off signal L and a forward or backward signal k from MPU 120.

The on-off signal L is a drive/stop command signal for the vibrator 128 in the vibration wave driving device as a second driving means. Further, the forward or backward signal k is a signal for commanding a direction of a traveling wave formed in the vibrator 129 in order to change over the drive direction of the carriage. Receiving these signals, the changeover switch 126 selects signals of respective phase outputs A, A*, B, B* so as to drive the vibrator 128 in the commanded drive direction and then puts them as drive phase outputs of C, D, E, and F signals into a drive circuit 127. The drive circuit 127 power-amplifies the signals up to the level enough to drive the vibrator 128 and outputs signals G, H to the vibrator 128 in the vibration wave driving device as the second driving means. The amplitude of the drive voltages of signals G, H changes in accordance to the pulse width set by the pulse width setting circuit 123, thereby changing the moving velocity of the carriage driven by the vibration wave driving device. For example, when the pulse width is gradually decreased, the drive voltage amplitude decreases in correspondence therewith so as to gradually decrease the velocity of the carriage.

Figure 10:
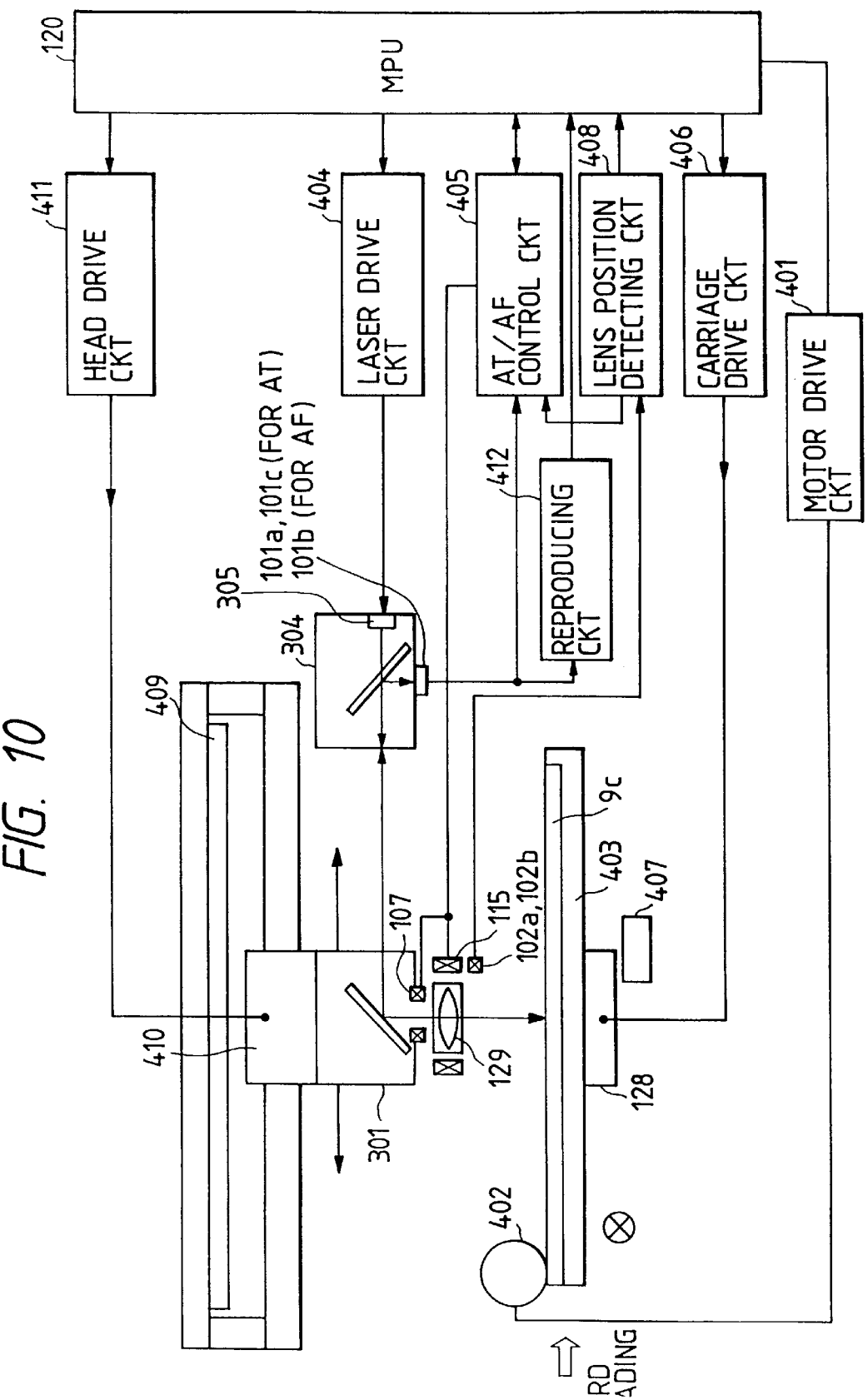
FIG. 10 is a block diagram to show the optical information recording and/or reproducing apparatus of the present invention.

FIG. 10 is a schematic drawing of the optical information recording and/or reproducing apparatus in which the control system of FIGS. 8A and 8B and the optical head system of FIG. 7 are incorporated.

Overview will be described using this drawing. First, when the optical card is inserted into the apparatus, an unrepresented sensor detects it and MPU 120 drives a loading motor 402 through a motor drive circuit 401 so as to introduce the optical card 9c into the apparatus and to mount it on the carriage 403.

Receiving a command from MPU 120, a laser drive circuit 404 drives the semiconductor laser 305. The semiconductor laser 305 thus driven emits a light beam. The light beam emitted is incident into the movable head 301, and the objective lens 129 converges the light beam on the optical card 9c mounted on the carriage 403. Receiving such a command from MPU 120 that the light beams are to be focused on the recording or reproducing surface of the optical card 9c using the AF coil 107 on the movable optical head 301, an AT/AF control circuit 405 performs AF pulling and autofocusing.

The details of the AF pulling are described referring to FIGS. 8A and 8B. The photodetector 101b detects the AF spot, which is the center light among the light beams reflected by the optical card 9c, and the AF error signal g, which is a difference signal between the sensor outputs a, b, is monitored through the comparator 118 by MPU 120.

At start of the AF pulling MPU 120 supplies a changeover signal to the changeover switch 105 to change over the switch to the X terminal side, thereby going into an AF pulling mode. A constant current flows through the AF coil, and the objective 129 moves normally to the medium surface.

Then MPU 120 detects an output from the comparator 118. The comparator 118 is arranged to output a signal at the AF in-focus point, and at this timing MPU 120 sends a changeover signal to the changeover switch 105 to change over the switch to the W terminal side, thereby going into an AF servo mode.

After completion of the above operation, the system is in an autofocusing state.

It is assumed herein that the above AF pulling is carried out when the light spots are located on associated tracks on the recording and/or reproducing medium.

Next, AT pulling and autotracking is carried out by the AT/AF control circuit 405 receiving such a command from MPU 120 as to perform tracking of a track on the optical card 9c, using the AT coil 115 as the first drive means on the movable head 301.

The details of the AT pulling are next described referring to FIGS. 8A and 8B.

At start of the AT pulling MPU 120 supplies a changeover signal to the changeover switch 110 to change over the switch to the Z terminal side, thereby going into an AT pulling mode. The lens position servo is formed via the phase compensator 114, AT coil driver 111, and AT coil 115 by a signal obtained by differential amplification between a lens position signal i as an output from the differential amplifier 112 and an output from the D/A converter 119 receiving a command from MPU 120 in the differential amplifier 113, and, gradually changing the output from the D/A converter 119, the objective lens is slowly moved in the direction perpendicular to the tracks on the card 9c (or in the direction traversing the tracks).

On the other hand, the AT error signal h, which is an output from the differential amplifier 108, is monitored through the comparator 117 by MPU 120, and when the light spot comes to be set on a track, MPU 120 sends a changeover signal to the changeover switch 110 to change over the switch to the Y terminal side, thereby going into an AT servo mode. After completion of the above operation, the system is in an autotracking (AT) state.

The description will be continued referring to FIG. 10.

MPU 120 supplies a certain drive frequency value to the carriage drive circuit 406 for driving the vibrator 128 in the vibration wave driving device as the second driving means, which is a feature of the present invention, to drive the vibrator 128. The vibrator 128 is in press contact with the guide plate 407 as a stator, and is frictionally driven by traveling waves so as to move the carriage 403. When the carriage 403 moves, that is, when the optical card 9c moves in the direction traversing the track, the objective lens 127 moves to follow the track because the system is in the AT state. Thus, the moving velocity of the objective lens 129 is measured on this occasion by the objective moving velocity detecting means composed of the lens position detecting circuit 408 and MPU 120. Some measurements are carried out at different drive frequencies and, based on the measurement results, a drive frequency is obtained for driving the carriage at a desired velocity.

The above measurements are carried out when the light beam scanning is stopped. Scanning of light beam is next carried out. Here, the above measurements and the operation to obtain the drive frequency for driving are executed prior to first scanning of light beam. If the light beam scanning were carried out before a proper drive frequency was obtained, presence of skew would be a factor of an increase of AT error or AT off because of carriage movement at an inappropriate velocity.

Namely, because the relation between the drive frequency and the moving velocity of the carriage immediately before operation is uniquely determined, frequency control can be achieved so as to be able to drive the carriage at an appropriate velocity even with skew upon operation.

The above embodiment, which is the major part of the present invention, will be described later on.

Next, an output from a head drive circuit 411 receiving a command from MPU 120 is input into a voice coil motor in a magnetic circuit composed of a magnet 409 and a voice coil 410, thus starting scanning of the movable optical head 301, that is, scanning of the light beam. For performing recording during scanning, a modulation signal is supplied from the laser drive circuit 404 to the semiconductor laser 305, so that information is written on the optical card 9c with a light beam of high power; for performing reading, an output signal from the AF photodetector 101b is input into a reproducing circuit 412, and the information written on the optical card 9c is reproduced and input into MPU 120.

During scanning of the movable optical head 301 and if the output from the lens position detecting circuit becomes off a predetermined range, the second drive means consisting of the vibration wave driving device is driven in order to keep the objective lens 129 within a predetermined range relative to the movable optical head 301.

On this occasion, the value obtained from the above measurement results is used as the drive frequency to achieve the drive velocity.

Figure 11:
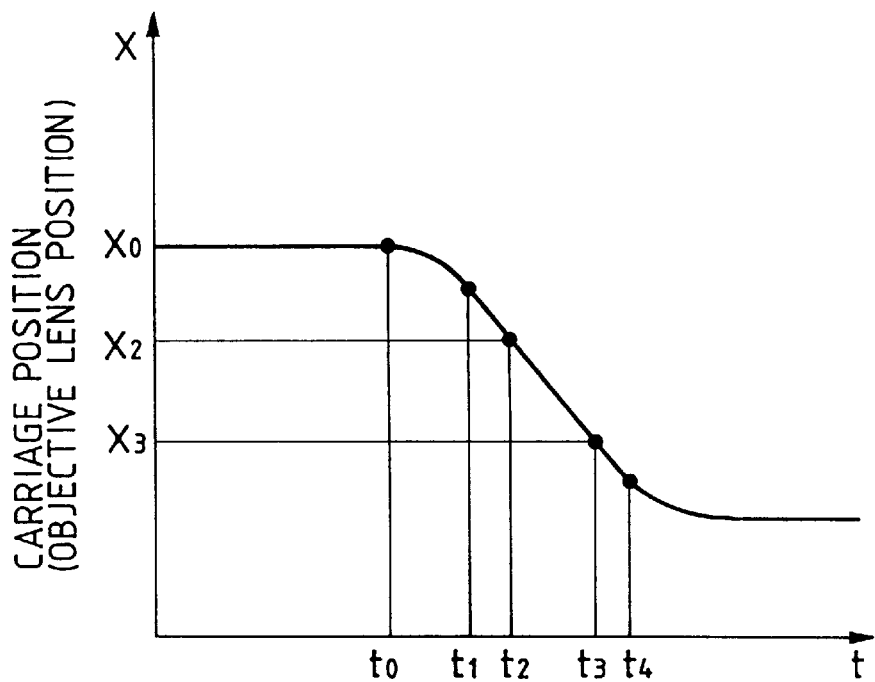
FIG. 11 is a drawing to show an output signal from the objective position detecting circuit shown in FIGS. 8A and 8B.
Figure 12:
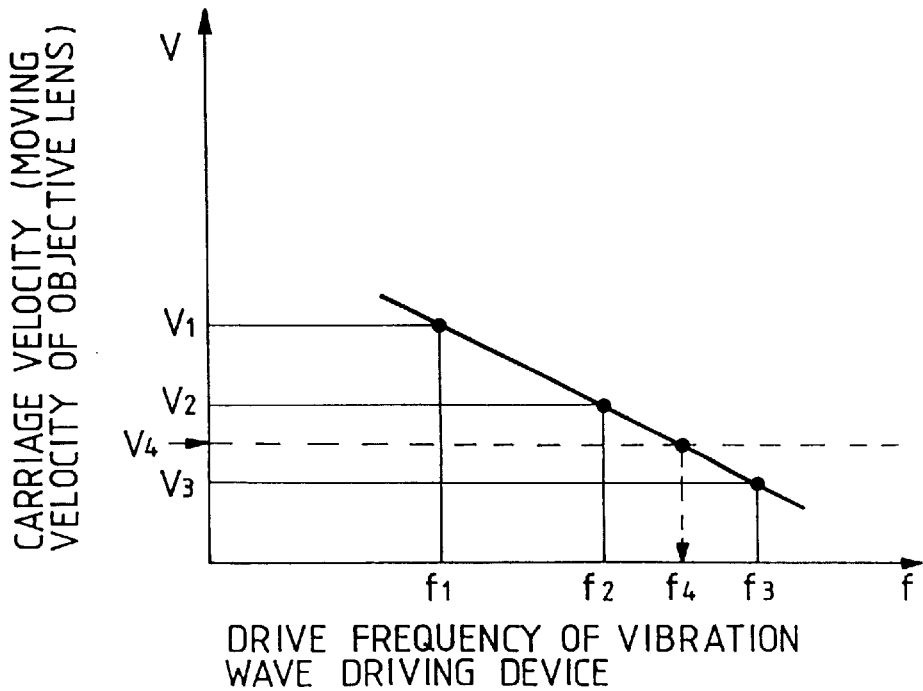
FIG. 12 is a drawing to show a relation between the drive frequency of the vibration wave driving device shown in FIGS. 8A and 8B and the carriage velocity.

Next described referring to FIG. 11 and FIG. 12 is a method for measuring the moving velocity of the carriage, that is, the moving velocity of the objective lens 129, which is the major part of the present invention.

FIG. 11 shows an output signal from the objective position detector in a tracking-on state when the carriage is driven by the ultrasonic motor with a certain, constant drive frequency $f_1$ and constant drive voltage amplitude. Movement of the carriage is started when the objective position is $x_0$ at time $t_0$, and $x_2$ is measured by the lens position detecting circuit 408 at time $t_2$ after time $t_1$ when the velocity becomes constant. Next, $x_3$ is measured at time $t_3$. By the above measurements the moving velocity $v_1$ of the carriage is obtained as $v_1=(x_3-x_2)/(t_3-t_2)$. This calculation is executed by MPU 120 using the position data from the lens position detecting circuit 408. The drive voltage amplitude is gradually decreased from time $t_4$ so as to slowly stop the carriage. This is done in order to keep tracking on also after measurement.

Next, similar measurements are carried out at drive frequencies $f_2$ and $f_3$ to obtain velocities $v_2$ and $v_3$.

FIG. 12 is a drawing (f-v diagram) to show a relation between the drive frequency f and the moving velocity v of the carriage as produced based on the above measurements. When the moving velocity of the carriage is desired to be set at $v_4$, the drive frequency $f_4$ can be obtained from the f-v diagram obtained by interpolation from the measured values as in FIG. 12.

Using the drive frequency $f_4$ as obtained in the above manner, the carriage velocity can be set at the desired velocity.

The first embodiment is so arranged that the AF pulling is carried out in a track region on the card and after the AF pulling, the AT pulling is carried out at that position of the light beam, but the AF pulling may be done in a trackless region on the optical card. In this case, the carriage needs to be moved to the track-existing region after completion of the AF pulling. In that case, the drive frequency for moving the carriage by the vibration wave driving device as the second drive means is determined to be a preliminarily set frequency. Since the system is in an AT off state upon movement of the carriage, the range of moving velocity is wide and a frequency can be set within the range capable of moving the carriage.

Further, the first embodiment employed the drive frequency as a control signal value of the velocity of the second drive means, but the drive voltage amplitude may be employed. Namely, some objective velocities are detected while keeping the drive frequency constant and changing the drive voltage amplitude, and a value of drive voltage amplitude that can drive the carriage at a desired carriage velocity can be obtained therefrom.

(Second Embodiment)

Figure 13:
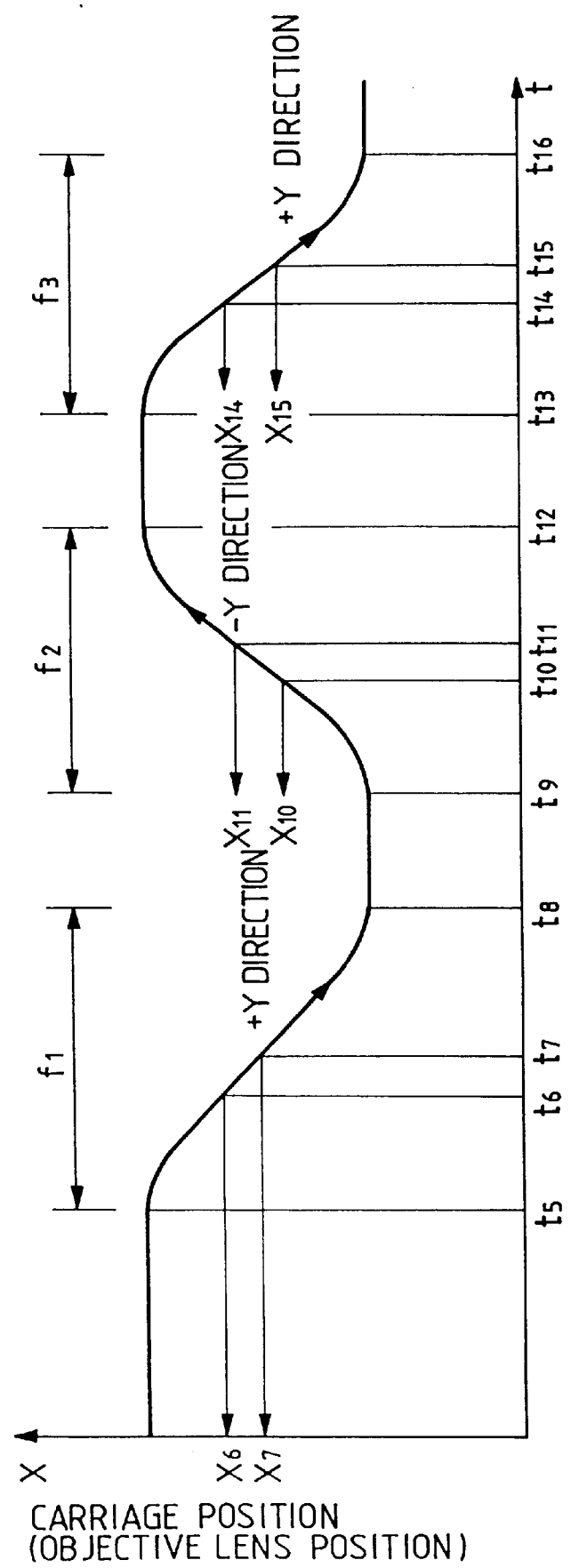
FIG. 13 is a drawing to show an output signal from the objective position detecting circuit in the second embodiment of the present invention.

FIG. 13 shows the second embodiment. The present embodiment is of a type of measuring the moving velocity of the objective 129 while moving the carriage back and forth.

First, the carriage starts being driven at drive frequency $f_1$ from time $t_5$ in the +Y direction, objective lens positions $x_6$, $x_7$ are measured at respective times $t_6$, $t_7$, and the carriage is stopped at $t_8$. Next, the carriage is driven at drive frequency $f_2$ from time $t_9$ in the -Y direction this time opposite to the first drive, objective lens positions $x_{10}$, $x_{11}$ are measured at respective times $t_{10}$, $t_{11}$, and then the carriage is stopped at time $t_{12}$. Similarly, positions $x_{14}$, $x_{15}$ are measured during drive at drive frequency $f_3$ in the +Y direction, thus obtaining three carriage velocities as in the first embodiment.

Since the present embodiment is so arranged that the objective lens is translated near the center position relative to the optical head, no AT off will occur during measurement.

Also, the present embodiment is so arranged that the measurements of moving velocity of objective lens are carried out after the optical card is loaded in the apparatus, after completion of the AF pulling and AT pulling, and before execution of light beam scanning, but the moving velocity measurements can be executed at a suitable time thereafter while the light beam scanning is not carried out.

Such a modification can be ready for load variations after the card is loaded.

(Third Embodiment)

Figure 14:
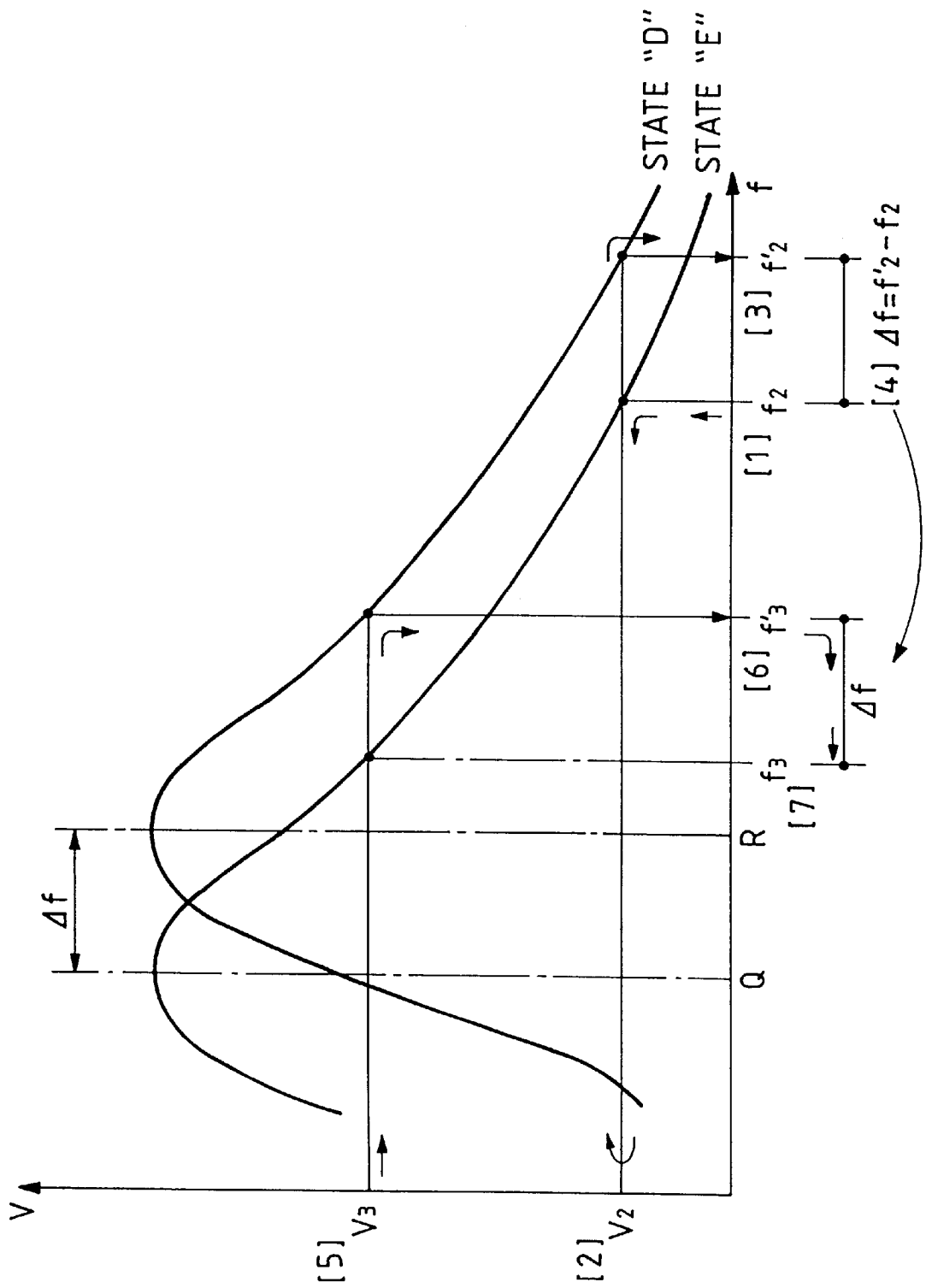
FIG. 14 is a drawing to show a relation between the frequency of the vibration wave driving device and the velocity in the third embodiment of the present invention.

FIG. 14 shows the third embodiment.

The first and second embodiments as described above are so arranged that in order to obtain an appropriate f-v relation, the carriage is driven at different frequencies and the moving velocities of the carriage are obtained by detecting the moving velocities of the objective lens upon the drive, thereby uniquely obtaining the f-v characteristic diagram, while the present embodiment is so arranged as to obtain an optimum f-v relation by a single frequency drive.

The basic structure of the present embodiment is substantially the same as that of the first embodiment shown in FIG. 7 to FIG. 10 except that a memory device connected to MPU 120 stores a basic characteristic curve to indicate a relation between the drive frequency (f) of the vibration wave driving device as the second drive means and the carriage velocity (v).

The f-v curve represented by the state D in FIG. 14 is the basic characteristic curve stored in the memory device added in the present embodiment.

FIG. 14 is a drawing (f-v diagram) to show the relation between the drive frequency of the vibration wave driving device and the carriage velocity, and shows a method for obtaining a drive frequency corresponding to a desired velocity. The curve of the state D is the f-v diagram preliminarily stored in the memory device, and another curve of the state E is an f-v relation diagram obtained upon pre-drive at a certain frequency. For example, the state D represents the f-v diagram in a standard state, while the state E represents the f-v diagram in a state after changed because of the temperature, the humidity, etc. Normally, a change of f-v relation due to the temperature and humidity has approximately such a relation that it is moved by Δf in the frequency direction as shown in FIG. 14. Next described is a method for obtaining a drive frequency corresponding to a desired velocity, using the f-v curve of the state D in FIG. 14, and the measured value shown in FIG. 12 as obtained in the same manner as in the first embodiment, that is, the carriage velocity $v_2$ at drive frequency $f_2$.

According to the method of FIG. 12, the carriage velocity $V_2$ [2] is measured at the drive frequency of $f_2$ [1].

Next, from the f-v diagram of the state D stored in the memory device, the drive frequency $f_2'$ in the standard state at the carriage velocity=$v_2$ is obtained [3]. A frequency shift amount Δf between the f-v relational diagrams is obtained by $\Delta f = f_2' - f_2$ [4]. Here, letting $v_3$ be a desired velocity [5], the drive frequency $f_3'$ in the standard state at the carriage velocity=$v_3$ is obtained [6] from the f-v diagram of the state D stored. Then the drive frequency $f_3$ corresponding to the desired velocity in the state E can be obtained as $f_3 = f_3' - \Delta f$ [7].

In the above manner, for example, a drive frequency corresponding to a desired carriage velocity upon carriage fine feed can be obtained. Also, a drive frequency corresponding to a desired carriage velocity upon seek, which is higher than the carriage velocity upon carriage fine feed, can also be obtained in the same manner, thus enabling to seek another track.

The third embodiment as described above is so arranged, similarly as the first and second embodiments, that the AF pulling is performed in the track-existing region on the card and after completion of the AF pulling, the AT pulling is carried out with the light beam [1], but the AF pulling may be executed in the trackless region on the optical card. In this case, the carriage needs to be moved to the track-existing region after the AF pulling. In that case, the drive frequency for moving the carriage by the ultrasonic motor as the second drive means is a preliminarily set frequency. Since the system is in the tracking off state upon movement of the carriage on this occasion, a frequency capable of moving the carriage may be set within a wide range of moving velocities.

(Fourth Embodiment)

Figure 15:
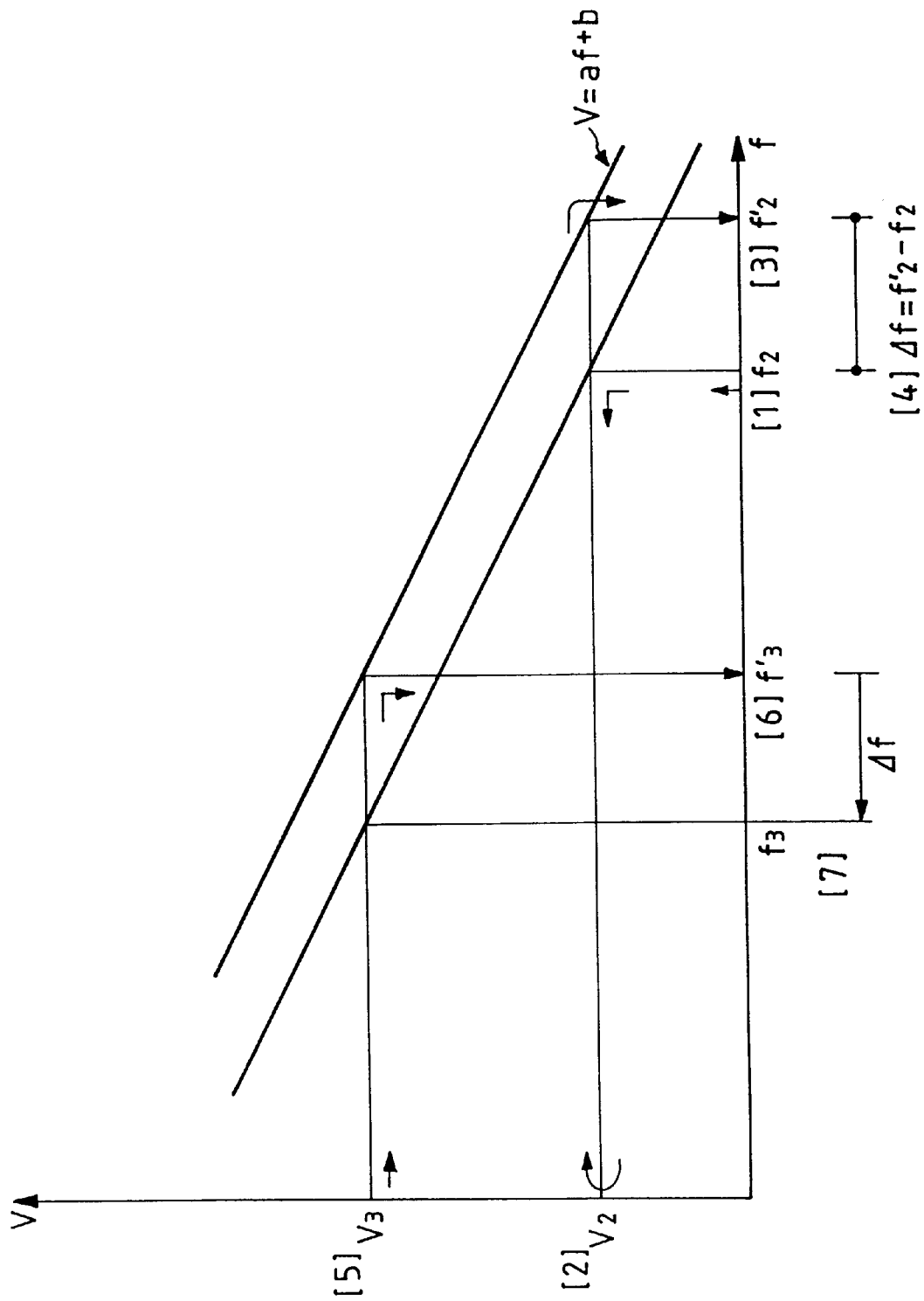
FIG. 15 is a drawing to show a relation between the frequency of the vibration wave driving device and the velocity in the fourth embodiment of the present invention.

FIG. 15 shows the fourth embodiment. The present embodiment is an example in which a drive frequency corresponding to a desired velocity is obtained when the relation between the drive frequency and the carriage velocity is linear. The present embodiment is also applicable to cases that the above f-v relation is partly linear and only the linear range is used for control. In this example, the stored data in the memory device connected to MPU 120, similarly as in the third embodiment, is not the f-v curve as in FIG. 14, but may be replaced by memory of a linear equation.

Setting of proper f-v in the present embodiment is perfomed by measuring the carriage velocity $v_2$ at drive frequency $f_2$, similarly as [1] and [2] in the third embodiment.

Next, letting v=af+b be the f-v line stored and $f_2'$ be f at v=$v_2$, the following relations are obtained from [3] and [4].

$$f_2'=(v_2-b)/a, \text{ and } \Delta f=f_2'-f_2$$

Here, letting $v_3$ be the desired velocity [5], the frequency $f_3'$ at v=$v_3$ is given by [6] $f_3'=(v_3-b)/a$.

Then the drive frequency $f_3$ for achieving the velocity $v_3$ is obtained as follows [7].

$$f_3=f_3'-\Delta f=\{(v_3-b)/a\}-\{[(v_2-b)/a]-f_2\}=[(v_3-v_2)/a]-f_2$$

The third and fourth embodiments as described above are so arranged that the relation between the drive frequency given to the second drive means and the drive velocity of the second drive means as stored in the memory device is defined by fixed values preliminarily input, but if initial variations between apparatus are great, the relation may be individually input upon assembly depending upon the characteristics of the second drive means.

The third and fourth embodiments are so arranged that the measurements of moving velocity of objective lens are carried out after the optical card is loaded in the apparatus, after completion of the AF pulling and AT pulling, and before execution of light beam scanning, but the moving velocity measurements can be executed at a suitable time thereafter while the light beam scanning is not carried out.

Such a modification can be ready for load variations after the card is loaded.

(Fifth Embodiment)

Figure 16:
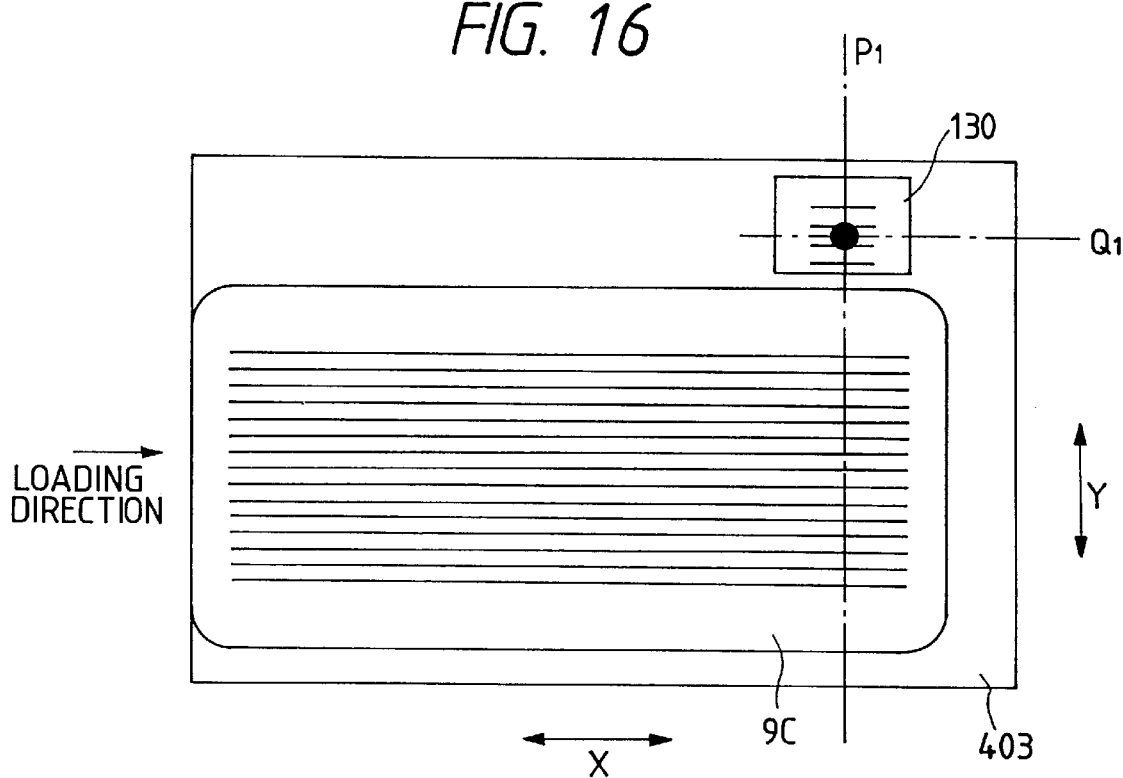
FIG. 16 is a plan view of the carriage in the fifth embodiment of the present invention.

FIG. 16 shows the fifth embodiment.

The embodiments as described above are arranged to obtain the optimal f-v characteristics, utilizing the tracks on the optical card 9c mounted on the carriage 403, but in these cases, the correction operation of f-v characteristics cannot be executed unless the optical card 9c actually used is mounted. The present embodiment is an example in which the correction operation of f-v characteristics can be executed without mounting the optical card 9c on the carriage 403.

The present embodiment is provided, as shown in FIG. 16, with a track pattern portion 130 in a surface region of carriage 403 away from the portion where the optical card 9c is mounted. In the track pattern portion 130 there are tracks formed with the same reflection characteristics, track width, and track pitch as those of the optical card 9c, and the tracks are formed in the same direction as the running direction of the tracks on the optical card 9c when the optical card 9c is mounted on the carriage 403.

Also, the carriage 403 is arranged so that the track pattern portion 130 can be moved to the position where it faces the movable optical head in order to perform the correction operation of f-v characteristics. For example, when the components of the apparatus body are initialized with input of the power supply to the apparatus body in the present embodiment, the carriage 403 goes into a card loading standby state in such a positional relation (Q1) that the light beam is incident to the track pattern portion 130.

Here, in the card loading standby state, a beam emitted from the semiconductor laser 305 driven by the laser driving circuit 404 receiving a command from MPU 120 is incident into the movable optical head 301 and then is converged by the objective lens 129 to impinge on the track pattern portion 130 on the carriage 403. Then the AF pulling and autofocusing and the AT pulling and autotracking as described previously are executed by the AT/AF control circuit 405 receiving such a command from MPU 120 that the light beam is to be focused on the track pattern portion 130, using the AF coil 107 on the movable optical head. Since this operation is the same as that in the embodiments as described above, the description thereof is omitted herein.

Also, the method for correcting the f-v characteristics in the autotracking state may be either one of the methods in the respective embodiments as described above.

After completion of correction of f-v characteristics, the AF and AT states are made off, and the apparatus goes into the standby state to await loading of the optical card 9c. When the optical card 9c is loaded, the carriage 403 moves to a predetermined position, and then the AF pulling and autofocusing and the AT pulling and autotracking are performed for recording or reproducing information.

(Sixth Embodiment)

Figure 17:
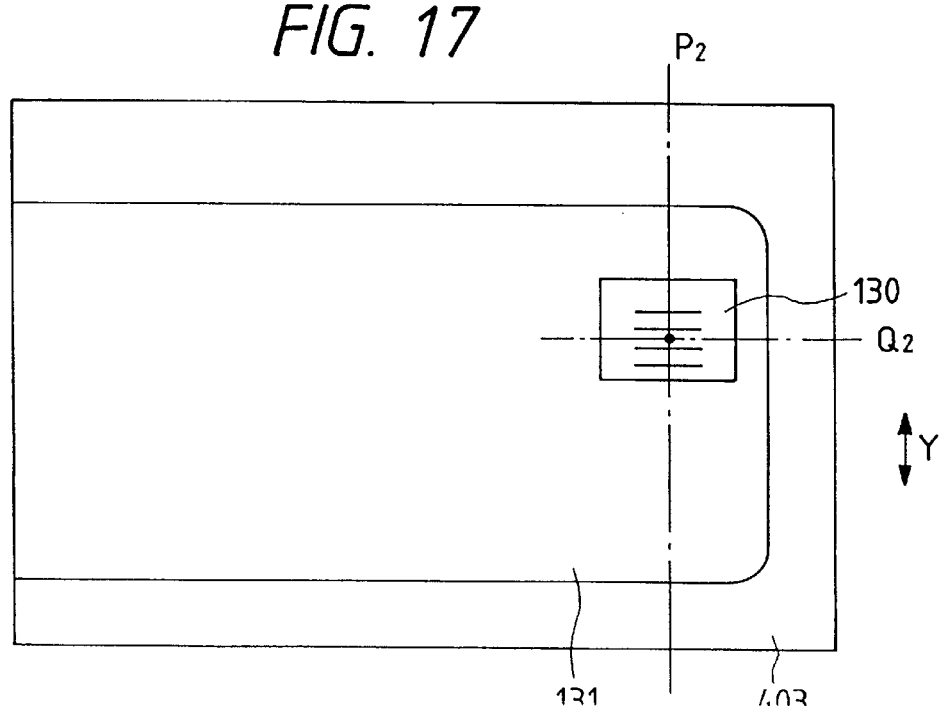
FIG. 17 is a plan view of the carriage in the sixth embodiment of the present invention.

FIG. 17 shows the sixth embodiment.

The fifth embodiment as described above and shown in FIG. 16 was so arranged that the track pattern portion 130 was located outside the optical card mounting portion of carriage 403, while the present embodiment is an example in which the track pattern portion 130 is provided in a mount portion 131 of optical card 9c. In the present embodiment, the track pattern portion 130 is placed at a position corresponding to a scan position $Q_2$ of the light beam in the state that the carriage 403 is located in the optical card loading standby state. According to the present embodiment, after the card is loaded in the standby state after frequency measurement, AF and AT can be made immediately effective at the light beam position ($Q_2$) without movement.

The fifth embodiment employed the measurement immediately after input of power supply, but similar measurement may be done at arbitrary time thereafter. For example, if the measurement is executed in the standby state after the card is ejected, the apparatus can be ready for variations of loads on the vibration wave driving device due to environmental changes etc. after the power is supplied.

(Seventh Embodiment)

Figure 18:
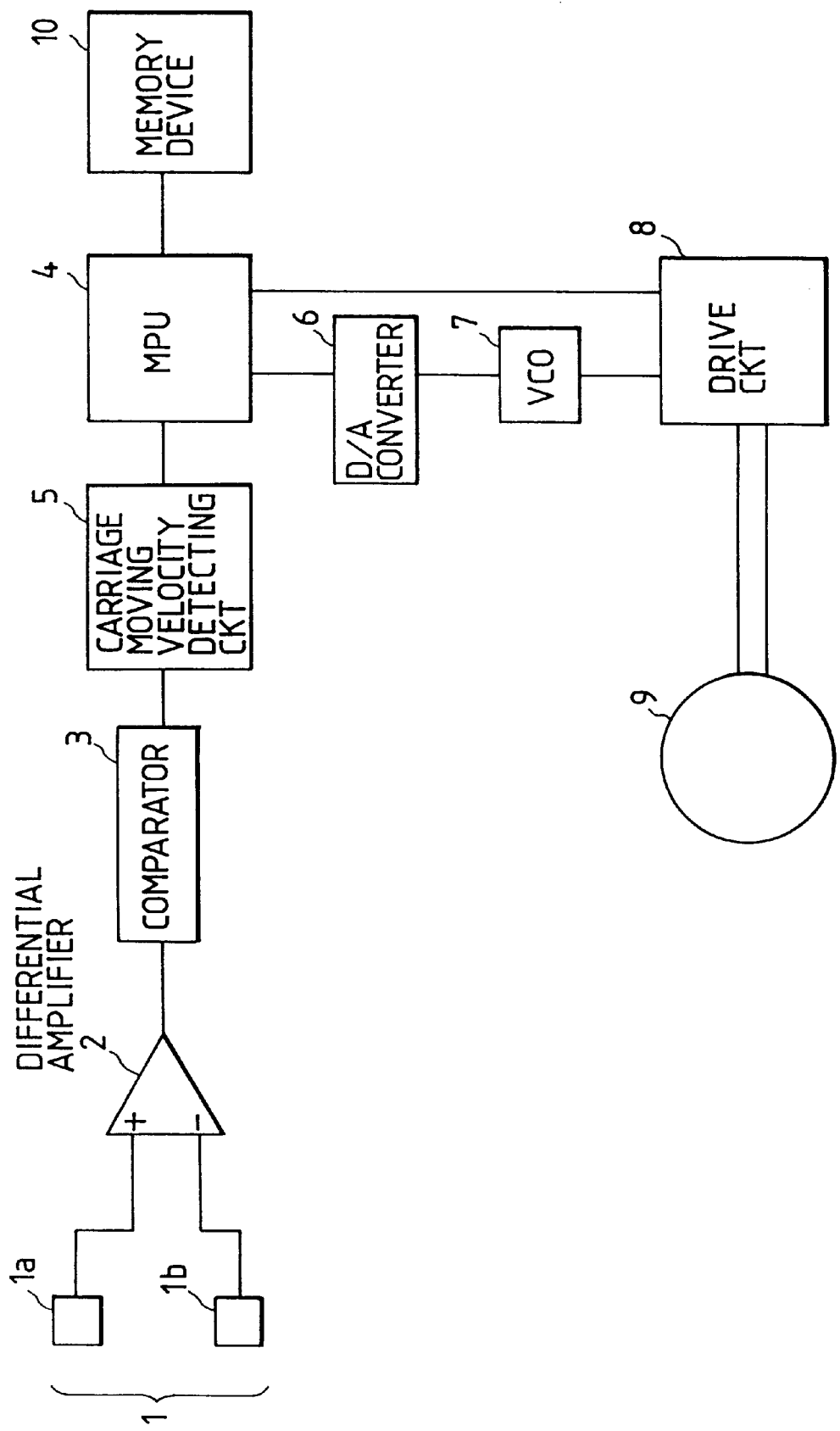
FIG. 18 is a block diagram to show the optical information recording and/or reproducing apparatus in the seventh embodiment of the present invention.

Another embodiment of the present invention will be described in detail referring to the drawing. FIG. 18 is a block diagram of a control system in the seventh embodiment of the optical information recording and/or reproducing apparatus of the present invention.

In FIG. 18, reference numeral 1 designates a photodetector for detecting reflected light of two light spots for tracking control as emitted from a semiconductor laser of a light source toward the optical card. The photodetector 1 is set in the stationary optical system shown in FIG. 3. The two light spots for tracking control are produced in the same manner as in the previously described embodiments, for example in such a manner that a light beam from the semiconductor laser is split into three beams, a main beam and two side beams, among which the two side beams are applied as the beams for tracking control to two tracking tracks on either side of an information track on the optical card.

Figure 19A:
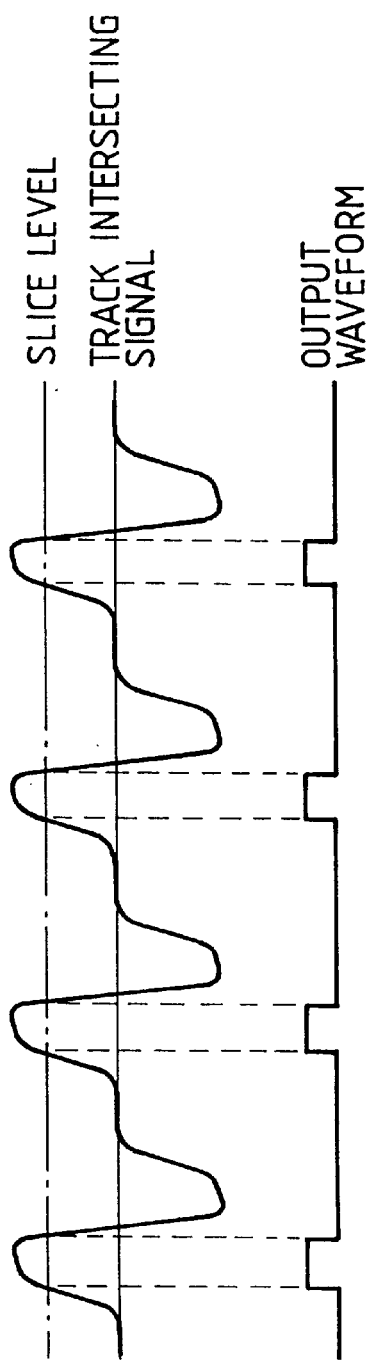
FIGS. 19A and 19B are waveform diagrams to show relations between track intersecting signal and slice level in forward and backward drive directions of the vibration wave driving device shown in FIG. 18.
Figure 19B:
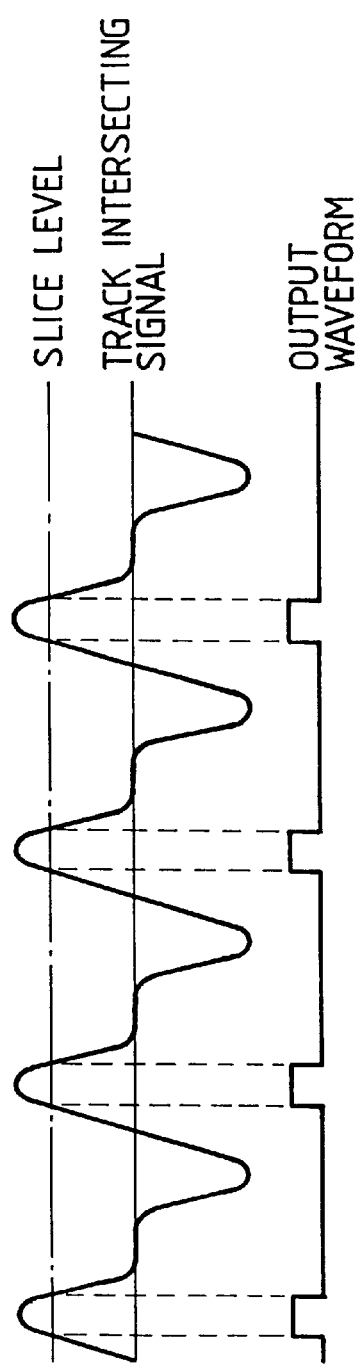

The photodetector 1 consists of detection segments 1a and 1b corresponding to the two light spots, so that reflected light of the two light spots from the tracking tracks are detected by the respective detection segments 1a, 1b. Detection signals from the detection segments 1a, 1b are differentially amplified by a differential amplifier 2 to be output as an information track intersecting signal. An information track intersecting signal is output every time the main beam traverses an information track while the information tracks move in either one of the traversing directions in the autofocus state. Then, this signal is binarized with a predetermined slice level in a comparator 3 and the thus binarized data is input into a carriage moving velocity detecting circuit 5. That state is shown in FIGS. 19A and 19B. In this case, because traveling waves excited in the vibrator in the vibration wave driving device travel in both directions, the carriage moving direction is of course either one of the two directions along the information track intersecting direction, which are denoted by direction 1 and direction 2 as shown in FIG. 19A and FIG. 19B, respectively. MPU 4 is a microprocessor circuit for controlling the components in the apparatus. Numeral 5 designates the carriage moving velocity detecting circuit for detecting the moving velocity of the carriage from a signal from the comparator 3; 6 a D/A converter for converting a digital output signal from MPU 4 to VCO 7 into an analog signal; 7 VCO for outputting a pulse signal of a frequency according to an output voltage from the D/A converter 6; 8 a drive circuit for performing on-off operation of a signal to the vibrator, producing signals 90 degrees phase-shifted by frequency-dividing a pulse signal from VCO 7, determining a rotational direction of the vibrator by combination of the signals, and further boosting the signal to an appropriate voltage to send it the vibrator 9; and 9 the vibrator for moving the carriage with the optical card mounted thereon in the information track intersecting direction.

The operation of the present embodiment is next described. First, after the optical card is loaded on the carriage in the apparatus from the outside, light beams from the unrepresented optical head are guided onto an information track in the optical card and the apparatus is kept in the autofocus state. After that, MPU 4 executes measurement of the carriage moving velocity in order to drive the carriage at a target velocity. First, MPU 4 outputs a voltage through the D/A converter 6 to VCO 7 so as to make VCO 7 output a pulse signal of a preliminarily set frequency. The pulse signal output from VCO 7 passes the drive circuit 8 and becomes drive voltages of two phases there, which are output to the vibrator 9. When the vibrator 9 is actuated, the information tracks on the optical card start moving relative to the light beams, so that the photodetectors 1a, 1b start outputting respective signals. The signals are input through the comparator 3 into the carriage moving velocity detecting circuit 5. Here, a pulse is input into the carriage moving velocity detecting circuit 5 every time the main beam crosses an information track. The carriage moving velocity detecting circuit 5 calculates a value resulting from dividing the width of a track on the optical card by an interval between rise edges in the pulse. Namely, it calculates the moving velocity of the carriage and outputs it to MPU 4.

Then, MPU 4 compares two values of the carriage moving velocity and the output voltage to the D/A converter 6 at this moment with stored data of characteristics of output voltage to D/A converter 6 versus carriage moving velocity as preliminarily measured and stored in the memory device 10. Here, if the two carriage moving velocities for a same output voltage to the D/A converter 6 are coincident with each other, the output voltage to the D/A converter 6 is determined hereinafter directly referring to the data in the memory device 10 as it is.

Figure 20:
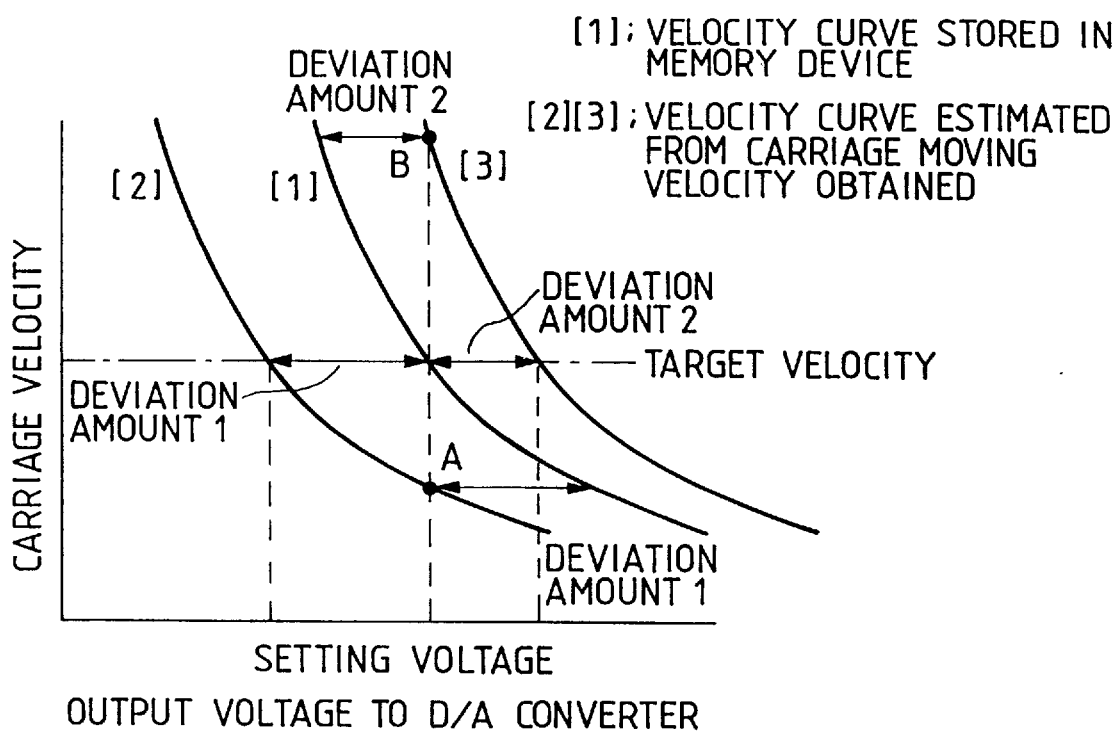
FIG. 20 is a drawing to show a relation between the setting voltage of the vibration wave driving device and the carriage velocity in the seventh embodiment of the present invention.

However, if the two carriage moving velocities are not coincident with each other herein, it is considered that the carriage moving velocity obtained must have some deviation amount in parallel, as shown in FIG. 20, relative to the stored data in the memory device 10. Thus, MPU 4 first determines whether the carriage moving velocity obtained is faster or slower than the target velocity. In that case, supposing the velocity curve stored in the memory device 10 decreases downward to the right as [1] in FIG. 20, the deviation must appear on the A point side if the carriage moving velocity is slower than the target velocity; or on the B point side if it is faster than the target velocity. Thus, MPU judges that the deviation amount is minus or on the side to execute subtraction of voltage, if the carriage moving velocity is on the A point side, that is, if the carriage moving velocity is slower than the target velocity. In contrast, if the carriage moving velocity is on the B point side, that is, if the carriage moving velocity is faster than the target velocity, MPU judges that the deviation amount is plus or on the side to execute addition of voltage.

Next, MPU 4 executes calculation of deviation amount of output voltage. First, looking at point A, the velocity curve of [1] is considered to deviate in parallel toward the lower output voltage side and to be changed into the characteristic of velocity curve of [2]. Thus, MPU 4 calculates an absolute value of a value obtained by subtracting an output voltage at point A from an output voltage at a velocity equal to that at point A in the curve of [1], and set the value as deviation amount 1. In contrast, looking at point B, the velocity curve of [1] is considered to deviate in parallel toward the higher output voltage side and to be changed into a characteristic of velocity curve of [3]. Thus, MPU 4 obtains an absolute value of a value obtained by subtracting an output voltage at point B from an output voltage at a velocity equal to that at point B in the curve of [1], and sets the value as deviation amount 2. Finally, if the measurement result is on the A point side, that is, if the carriage moving velocity is slower than a setting velocity, MPU executes subtraction of deviation amount 1 from the setting voltage. If the measurement result is on the B point side, that is, if the carriage moving velocity is faster than the target velocity, MPU executes addition of deviation amount 2 to the setting voltage. This enables the carriage to move at the target velocity.

(Eighth Embodiment)

In the seventh embodiment as described above, the relation with the output voltage to the D/A converter 6 cannot be attained for controlling the carriage moving velocity at the target velocity unless the optical card is mounted on the carriage, similarly as in the first to fourth embodiments.

Figure 21:
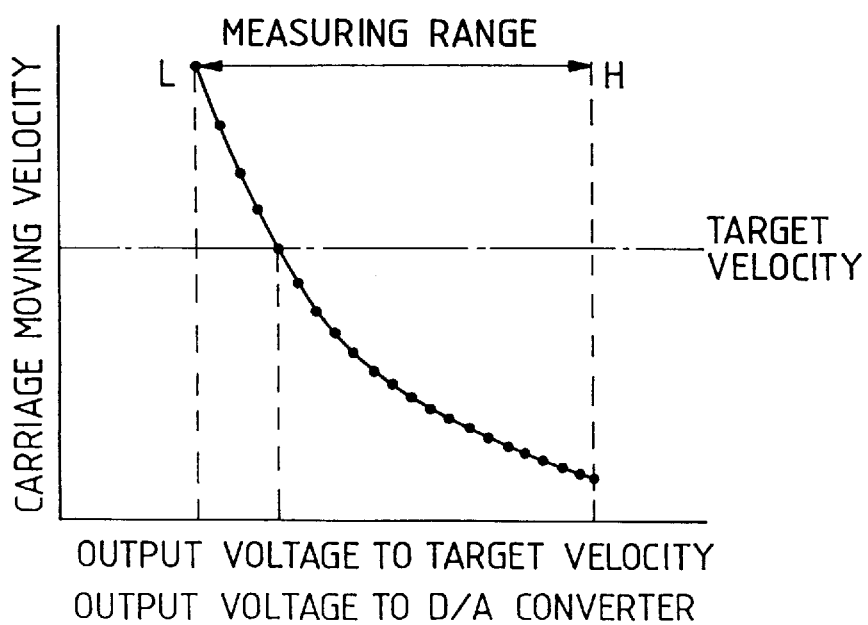
FIG. 21 is a drawing to show a relation between the setting voltage of the vibration wave driving device and the carriage velocity in the eighth embodiment of the present invention.

The present embodiment has the same basic structure as the seventh embodiment, but the present embodiment is so arranged, as shown in FIG. 16 or FIG. 17, that the track pattern portion is provided on the carriage, that AT is turned off before the optical card is mounted on the carriage, similarly as in the seventh embodiment, that the seek operation of the carriage is effected while keeping AF on as to the objective lens in the movable optical head, that a pulse is input into the carriage moving velocity detecting circuit 5 every time the main beam traverses an information track, and that the carriage moving velocity detecting circuit 5 calculates a value of division of the width of a track in the track pattern portion by an interval between rise edges of the pulse. Namely, the carriage moving velocity is calculated and then is output to MPU 4. Here, MPU 4 stores two values of the carriage moving velocity and the output voltage to D/A converter 6 at this moment. After that, MPU 4 increases or decreases the output voltage to D/A converter 6 by a constant value and again performs the same operation, then repeating this measurement with voltages in a certain determined range, as shown in FIG. 21. Based on the above operation, information concerning the relation of output voltage to the D/A converter 6 versus carriage moving velocity is stored in MPU 4. The measurement results of the output voltage to D/A converter 6 versus carriage moving velocity are as shown in FIG. 21. A characteristic curve represented by the solid line indicates an actual, continuous relation of output voltage to D/A converter 6 versus carriage moving velocity, and black dots represent measured points.

In this case, no problem will be caused by whether the changing direction of output voltage to D/A converter 6 is set from L side to H side or from H side to L side. From a result of this measurement, MPU 4 can attain an output voltage to the D/A converter 6 for driving the carriage 10 at the target velocity. After the carriage moving velocity is measured at some points in the above manner and if the velocity is not coincident with the target velocity, interpolation is made to obtain an output voltage value corresponding to the target velocity.

Thus, where seek control or relative fine movement is carried out in the state that the optical card is actually mounted on the carriage 10, the carriage 10 can be moved at the desired velocity when MPU 4 outputs the output voltage obtained by the above method to the D/A converter 6.

(Ninth Embodiment)

Figure 22:
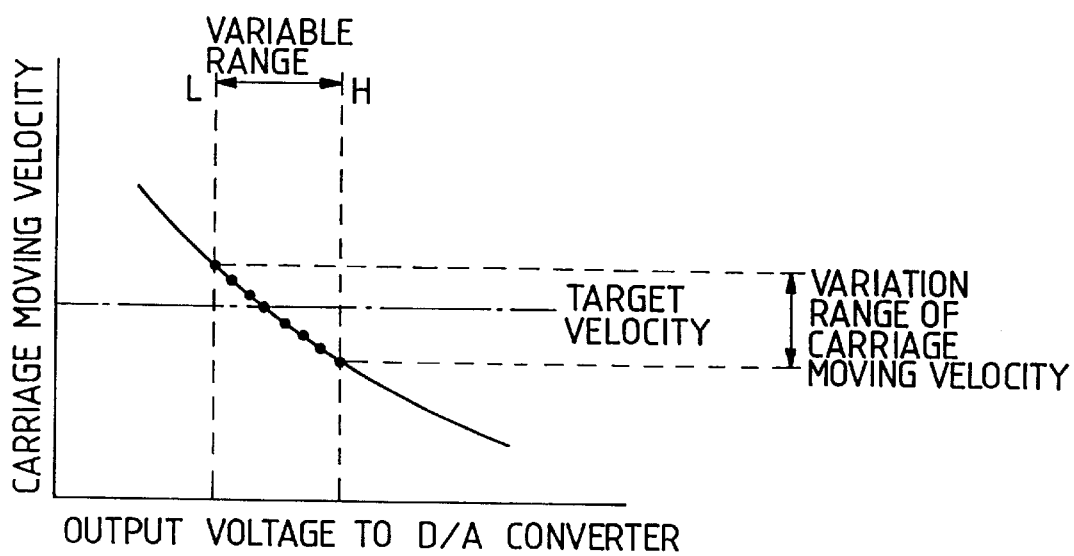
FIG. 22 is a drawing to show a relation between a variable range of the setting voltage of the vibration wave driving device and a variable range of the carriage moving velocity in the eighth embodiment of the present invention.

In the eighth embodiment as described above, the characteristic diagram shown in FIG. 21 is based on the condition that the target velocity is included in the variation range of carriage moving velocity against a voltage variable range (measurement range) of output voltage to D/A converter 6 at point of measurement, as shown in FIG. 22. Accordingly, the voltage variable range must satisfy the above condition at least upon setting.

Incidentally, if there is some change in the curve of output voltage to D/A converter 6 versus carriage moving velocity between the point when the measurement was carried out and the point when the voltage variable range was set, there is a possibility that the target value of the carriage cannot be attained within this voltage variable range.

Figure 23:
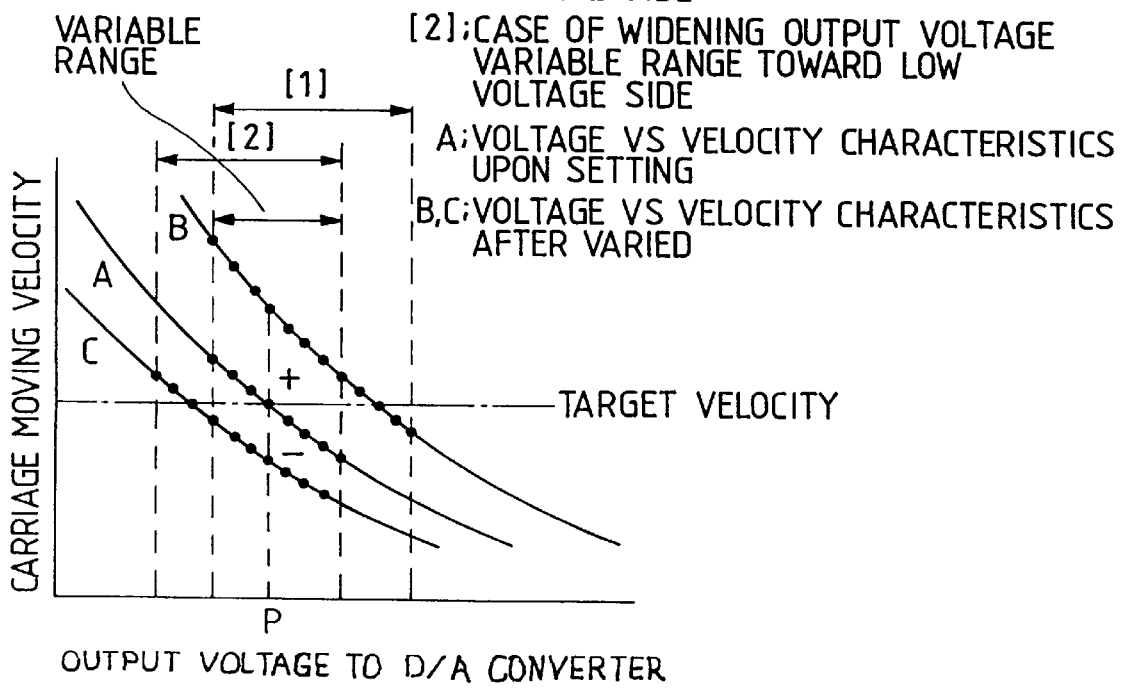
FIG. 23 is a drawing to show a relation between the setting voltage of the vibration wave driving device and the carriage velocity in the ninth embodiment of the present invention.

There are considered two states of B and C in FIG. 23 as cases for MPU 4 to fail to detect the target velocity. In the case of B, because the curve of output voltage to D/A converter 6 versus carriage moving velocity is shifted in parallel toward higher output voltages to D/A converter, measurement will end before obtaining an output voltage to D/A converter 6 for driving the carriage at the target velocity. In the case of C, because the curve of output voltage to D/A converter 6 versus carriage moving velocity is shifted in parallel toward lower output voltages to D/A converter 6, measurement will end before obtaining an output voltage to D/A converter 6 for driving the carriage at the target velocity. Therefore, for these two cases, the measurement range must be widened on the higher output voltage side or on the lower output voltage side. In order for MPU 4 to judge which side should be widened, MPU 4 is arranged to store the output voltage to D/A converter 6 for the carriage to move at the target velocity upon setting the voltage variable range. This is point P in FIG. 23.

If MPU 4 fails to detect the target velocity in the present embodiment, the carriage moving velocity measured at the point P is compared with the target velocity. As seen from FIG. 23, the carriage moving velocity measured becomes faster than the target velocity if the curve is shifted in parallel toward the higher output voltages to D/A converter 6. In this case, the output voltage to D/A converter 6 is to be increased, and then the measuring range is widened on the higher output voltage side. Namely, the variable range may be set in the region shown by [1] in FIG. 23. In contrast, if the curve is shifted in parallel toward the lower output voltages to D/A converter 6, the situation is opposite, i.e., the carriage moving velocity measured becomes slower than the target velocity. In this case, the output voltage to D/A converter 6 is to be decreased, and the measuring range may be widened on the lower output voltage side as shown by [2] in FIG. 23. After that, this operation is continued before MPU 4 detects the target velocity, thereby obtaining the output voltage to D/A converter 6 for the carriage to be moved at the target velocity.

For actually performing the seek control or relative fine movement, MPU 4 outputs the output voltage to D/A converter 6 as obtained by the above method thereto, thereby moving the carriage at the target velocity.

After measurements of the carriage moving velocity were performed at some points according to the above measurement and if the target velocity is not achieved, interpolation is made to obtain an output voltage value corresponding to the target velocity.

The seventh to ninth embodiments as described above are so arranged that the carriage is moved in the direction traversing the information tracks, but it is conceivable that the carriage is arranged to be fixed in the information track intersecting direction, but that the optical head is arranged to move in the information track intersecting direction thereof by drive of the vibration wave driving device.

The above embodiments were described as examples of apparatus enabling both recording and reproduction, but the invention is by no means limited to it; for example, the apparatus may be arranged to perform only recording or only reproduction.

(Tenth Embodiment)

Since the basic structure of the present embodiment is the same as that of the first embodiment, description thereof is omitted herein. In the present embodiment, the vibration wave driving device is driven in the state of performing the AT control and the lens position detecting circuit 408 measures a moving distance of the objective lens 129 a predetermined time after the drive start of the vibration wave driving device. Obtained based on this measurement result is a drive frequency for driving the carriage at a desired velocity.

The above measurement is carried out while the light beam scanning is stopped. Next, the light beam scanning is carried out, but the above measurement and the operation to obtain the drive frequency for drive are performed before first scanning of light beam. If the light beam scanning is performed before an appropriate drive frequency is obtained, presence of skew would result in carriage movement at an inappropriate velocity so as to cause an increase of AT error or AT off.

Namely, because the relation between the drive frequency and the carriage moving velocity immediately before operation is uniquely determined, frequency control can be realized so as to enable drive at optimum velocity of the carriage even with skew upon operation.

Figure 24:
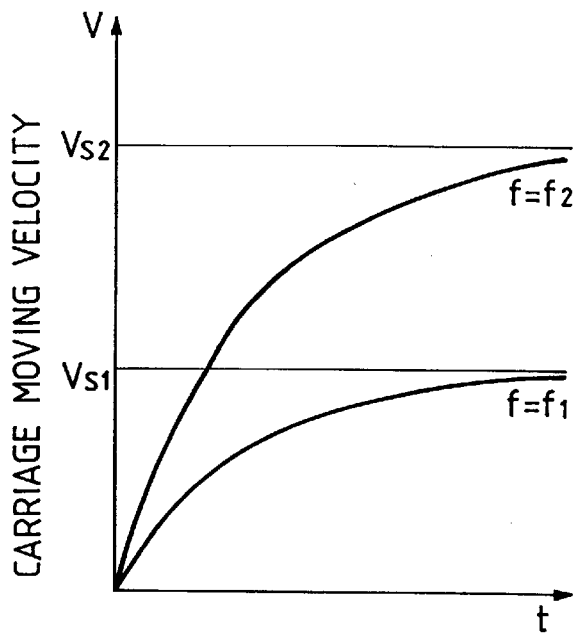
FIG. 24 is a drawing to show step responses of carriage moving velocity in the tenth embodiment of the present invention.
Figure 25:
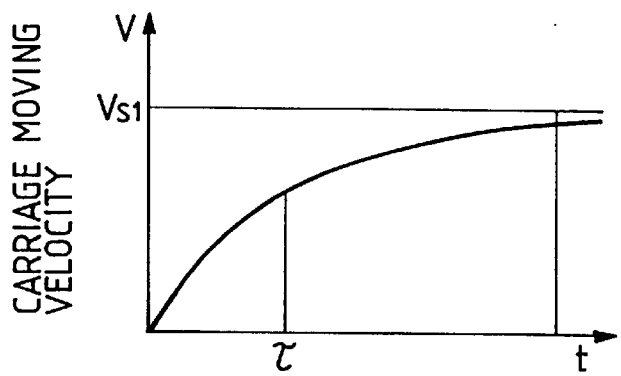
FIG. 25 is a drawing to show a step response of carriage moving velocity in the tenth embodiment of the present invention.
Figure 26:
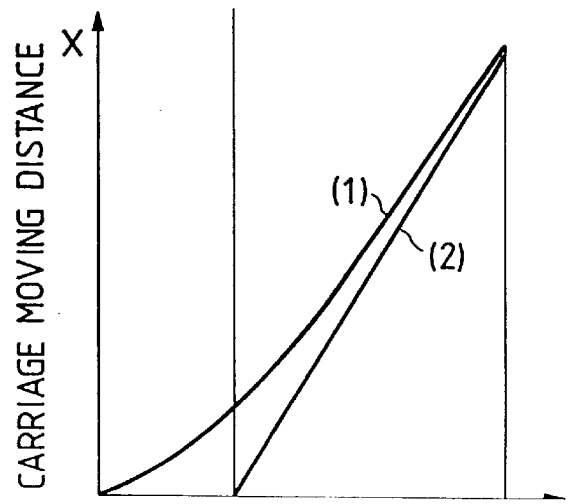
FIG. 26 is a drawing to show a step response of carriage moving distance in the tenth embodiment of the present invention.

Next, how to obtain the drive frequency of the carriage in the present embodiment is described in detail referring to FIG. 24, FIG. 25, and FIG. 26.

FIG. 24 shows step responses of the moving velocity of the carriage by the vibration wave driving device.

Velocity characteristics between the vibration wave driving device and the carriage are in a nearly linear response, which are defined as follows with the carriage velocity being v.

$$v = v_s(1 - e^{-(t/\tau)})$$

where $v_s$ is a final velocity of the carriage and $\tau$ is a time constant determined by an inertial mass and a frictional force.

If the drive frequency f for constant drive voltage of the vibration wave driving device is given as $f=f_1$, $v_s=v_{s1}$; if $f=f_2$, $v_s=v_{s2}$.

In this manner, the final velocity $v_s$ changes depending upon the drive frequency.

FIG. 25 is a step response of the carriage velocity at $f=f_1$, and FIG. 26 shows a moving distance x of the carriage at $f=f_1$ corresponding to FIG. 25. The following relationships hold.

For the case of FIG. 25, $$v = v_{s1}(1 - e^{-(t/\tau)})$$

For the case of FIG. 26, $$x = v_{s1}\{t - \tau(1 - e^{-(t/\tau)})\} \quad (1)$$

Here, in order to obtain $v_{s1}$, assuming $\tau$ is known and constant, to be obtained is a relation between x and t.

Since an asymptote of (1) is given by $x=(t-\tau)v_{s1}$, an approximate value is obtained as follows.

$$v_{s1} = x/(t-\tau) \quad (2)$$

As described above, the final velocity $v_{s1}$ can be obtained in the above manner by detecting the carriage movement distance x by the objective position detecting means after a lapse of a predetermined time from the drive start while the carriage is driven by the vibration wave driving device. If this velocity measurement is executed for a plurality of drive frequencies, the f-v relation as shown in FIG. 12 can be attained. If the moving velocity of the carriage is desired to be set at $v_4$, the drive frequency $f_4$ can be attained from the f-v relation. Here, the accuracy is improved more as the predetermined time is greater than the time constant $\tau$. Supposing $t=3\tau$, a difference is within about 2.5 % as follows.

From Equation (1), $v_{s1} = x/2.05\tau$
From Equation (2), $v_{s1} = x/2\tau$ (from the asymptote)

Although the above embodiment is so arranged that the calculation of the velocity is performed using the time constant $\tau$, the velocity can be obtained by $v_{s1}=x/t$ if $\tau$ is sufficiently small.

The tenth embodiment as described above employed the drive frequency as a velocity control signal value of the second drive means, but the amplitude of drive voltage may be employed instead thereof.

Namely, it is conceivable that the amplitude of drive voltage is changed with keeping the drive frequency constant, to detect velocities of the objective lens at some points and to obtain an amplitude value of drive voltage capable of driving at a desired carriage velocity.

Also, the present embodiment is so arranged that the measurements of moving velocity of objective lens is carried out after the optical card is loaded in the apparatus, after completion of the AF pulling and AT pulling, and before execution of light beam scanning, but the moving velocity measurements can be executed at a suitable time thereafter while the light beam scanning is off. Such a modification can be ready for load variations after the card is loaded.

Although the above embodiments were described as apparatus that were able to perform both recording and reproduction of information, it is needless to mention that the invention can be applied to apparatus that can perform only recording or only reproduction.

What is claimed is:

1. A vibration driven motor device in which frequency signals having different phases are applied to an electro-mechanical energy conversion element provided on a vibration member to generate a vibration in the vibration member so as to obtain a driving force, said vibration driven motor device comprising:

memory means for storing information indicating a reference driving characteristic of the motor, the reference driving characteristic including a relationship between a value of the frequency signal applied to the electro-mechanical energy conversion element and a driving output of the vibration driven motor device;

means for measuring a driving output of said vibration driven motor device when a frequency signal having a predetermined value is applied to said electro-mechanical energy conversion element; and calculation means for calculating a frequency signal value for obtaining a predetermined output characteristic on the basis of the driving output measured by said measuring means and the reference driving characteristic stored in said memory means.

2. A vibration driven motor device according to claim 1, wherein said memory means stores data corresponding to a relationship between frequency signal values and output characteristics, and said calculation means calculates the frequency signal value for obtaining the predetermined output characteristic in accordance with said data and the driving output measured by said measuring means.

3. A vibration driven motor device according to claim 1, wherein said calculation means detects a value corresponding to a difference between the driving output measured by said measuring means and the reference driving characteristic upon application of a frequency signal having the predetermined value on the basis of the reference driving characteristic stored in said memory means and the driving output measured by said measuring means, and calculates a frequency signal value for obtaining the predetermined output characteristic on the basis of the reference driving characteristic stored in said memory means and the value detected by said calculation means.

4. A vibration driven motor device according to claim 1, further comprising a drive circuit, wherein said drive circuit is operable in a first mode for applying the frequency signal having the predetermined value to said electro-mechanical energy conversion element and in a second mode for applying a frequency signal having the frequency signal value calculated by said calculation means to said electro-mechanical energy conversion element, and, wherein operation of said drive circuit is shifted from the first mode to the second mode.

5. A vibration driven motor device in which frequency signals having different phases are applied to an electro-mechanical energy conversion element provided on a vibration member to generate a vibration in the vibration member so as to obtain a driving force, said vibration driven motor device comprising:

memory means for storing information indicating a reference driving characteristic of said vibration driven motor device, the reference driving characteristic including a relationship between a value of the frequency signal applied to the electro-mechanical energy conversion element and a driving output of the vibration driven motor device;

means for measuring the driving output of said vibration driven motor device when a frequency signal having a predetermined value is applied to said electro-mechanical energy conversion element; and calculation means for (i) providing data corresponding to a difference between the reference driving characteristic stored in said memory means and an actual driving characteristic, on the basis of (1) the driving output measured by said measuring means and (2) the relationship stored in said memory means, and (ii) calculating a value of a frequency signal for obtaining a predetermined driving output, on the basis of the data provided by said calculation means and the information stored in said memory means.

* * * * *

UNITED STATES PATENT AND TRADEMARK OFFICE
CERTIFICATE OF CORRECTION

PATENT NO. : 5,990,596

DATED : November 23, 1999

INVENTOR(S): HIROTO KITAI, ET AL.

It is certified that error appears in the above-identified patent and that said Letters Patent is hereby corrected as shown below:

Title page,
At [56] References Cited

FOREIGN PATENT DOCUMENTS,

"1021688" should read --1-21688--.
"1264665" should read --1-264665--.
"3256579" should read --3-256579--.
"5095685" should read --5-95685--.

Column 14

Line 10, "changed because" should read --a change in--.
Line 11, "of" should be deleted.

Signed and Sealed this

Twelfth Day of September, 2000

Attest:

Q. TODD DICKINSON

*Attesting Officer*     *Director of Patents and Trademarks*